(12) United States Patent
Bjorklund et al.

(10) Patent No.: US 10,924,738 B2
(45) Date of Patent: Feb. 16, 2021

(54) SELECTING ENCODING OPTIONS

(71) Applicant: Arm Limited, Cambridge (GB)

(72) Inventors: John Nils Andreas Bjorklund, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 81 days.

(21) Appl. No.: 16/169,674

(22) Filed: Oct. 24, 2018

(65) Prior Publication Data
US 2019/0124331 A1 Apr. 25, 2019

(30) Foreign Application Priority Data
Oct. 25, 2017 (GB) .................................. 1717546.4

(51) Int. Cl.
| | | |
|---|---|---|
| H04N 19/124 | (2014.01) | |
| H04N 19/103 | (2014.01) | |
| H04N 19/18 | (2014.01) | |
| H04N 19/625 | (2014.01) | |
| H04N 19/176 | (2014.01) | |
| H04N 19/14 | (2014.01) | |
| H04N 19/149 | (2014.01) | |

(52) U.S. Cl.
CPC ......... *H04N 19/124* (2014.11); *H04N 19/103* (2014.11); *H04N 19/14* (2014.11); *H04N 19/149* (2014.11); *H04N 19/176* (2014.11); *H04N 19/18* (2014.11); *H04N 19/625* (2014.11)

(58) Field of Classification Search
CPC .. H04N 19/124; H04N 19/149; H04N 19/103; H04N 19/18; H04N 19/625; H04N 19/176; H04N 19/14; H04N 19/50

USPC ..................................................... 375/240.03
See application file for complete search history.

(56) References Cited

U.S. PATENT DOCUMENTS

| | | |
|---|---|---|
| 7,995,657 B2 | 8/2011 | Cheong |
| 8,059,721 B2 | 11/2011 | Chang |

(Continued)

FOREIGN PATENT DOCUMENTS

| | | |
|---|---|---|
| EP | 0742674 | 11/1996 |
| GB | 2554680 | 4/2016 |
| WO | 03/056839 | 7/2003 |

OTHER PUBLICATIONS

GB Combined Search and Examination Report dated Apr. 25, 2018, GB Patent Application GB1717546.4.

(Continued)

*Primary Examiner* — Allen C Wong
(74) *Attorney, Agent, or Firm* — Vierra Magen Marcus LLP

(57) ABSTRACT

When encoding an array of data elements using an encoding process that generates an array of quantized frequency domain coefficients corresponding to an array of difference values between a source block of data elements of the array of data elements being encoded and a reference block of data elements, a bit count value for encoding an array of quantized frequency domain coefficients to be used to select whether to encode the source block in accordance with a particular set of encoding options is estimated by estimating a bit count value for encoding the locations of the non-zero quantized frequency domain coefficients in the array of quantized frequency domain coefficients based on the number of non-zero frequency domain coefficients in the array of quantized frequency domain coefficients.

22 Claims, 7 Drawing Sheets

(56) References Cited

U.S. PATENT DOCUMENTS

| | | |
|---|---|---|
| 8,249,145 B2 | 8/2012 | Chang |
| 8,259,813 B2 | 9/2012 | Hvidsten |
| 8,351,513 B2 | 1/2013 | Wen |
| 8,437,404 B2 | 5/2013 | Luna |
| 8,472,530 B2 | 6/2013 | Kim |
| 8,654,859 B1 | 2/2014 | Linzer et al. |
| 8,665,960 B2 | 3/2014 | Zheludkov |
| 8,700,794 B2 | 4/2014 | Kim |
| 8,724,916 B2 | 5/2014 | Regunathan |
| 9,571,840 B2 | 2/2017 | Regunathan |
| 2005/0094729 A1 | 5/2005 | Yuan |
| 2005/0276493 A1 | 12/2005 | Xin |
| 2007/0237236 A1 | 10/2007 | Chang |
| 2008/0165861 A1 | 7/2008 | Wen |
| 2008/0243971 A1 | 10/2008 | Po |
| 2008/0260278 A1 | 10/2008 | Zuo |
| 2010/0262712 A1 | 10/2010 | Kim |
| 2012/0155532 A1 | 6/2012 | Puri |
| 2013/0301699 A1* | 11/2013 | Pearson .............. H04N 19/149 375/240.02 |
| 2013/0301738 A1 | 11/2013 | Kim |
| 2014/0016708 A1 | 1/2014 | Wang |
| 2014/0119451 A1* | 5/2014 | Sethuraman .......... H04N 19/39 375/240.16 |
| 2014/0140399 A1 | 5/2014 | Seregin |
| 2014/0169444 A1* | 6/2014 | Ottaviano ............ H04N 19/63 375/240.01 |
| 2014/0301463 A1 | 10/2014 | Rusanovskyy |
| 2014/0307781 A1 | 10/2014 | He |
| 2014/0362905 A1 | 12/2014 | Nguyen |
| 2015/0016512 A1 | 1/2015 | Pu |
| 2015/0016536 A1 | 1/2015 | Hsieh |
| 2015/0110167 A1 | 4/2015 | Chen |
| 2015/0117519 A1 | 4/2015 | Kim |
| 2015/0139331 A1 | 5/2015 | Hsieh |
| 2015/0172661 A1 | 6/2015 | Dong |
| 2015/0288964 A1 | 10/2015 | Puri |
| 2015/0326877 A1 | 11/2015 | Narroschke |
| 2016/0094855 A1 | 3/2016 | Zhou |
| 2016/0105688 A1 | 4/2016 | Hendry |
| 2016/0134877 A1 | 5/2016 | Chong |
| 2016/0165234 A1 | 6/2016 | Kim |
| 2018/0098078 A1 | 4/2018 | Huggoson |

OTHER PUBLICATIONS

Response to Office Action dated Sep. 18, 2019, U.S. Appl. No. 15/714,060.

Notice of Allowance dated Oct. 3, 2019, U.S. Appl. No. 15/714,060.

GB Combined Search and Examination Report dated Mar. 15, 2017, GB Patent Application No. GB1616794.2.

GB Search Report dated Jul. 12, 2017, GB Patent Application No. GB1616794.2.

Joshi et al, Low complexity hardware implementation of quantization and CAVLC for H.264 Encoder (Year: 2014).

Office Action dated Mar. 18, 2019, U.S. Appl. No. 15/714,060.

* cited by examiner

SELECTING ENCODING OPTIONS

BACKGROUND

The technology described herein relates to a method of and apparatus for selecting encoding options to use when encoding an array of data elements of a stream of arrays of data elements.

It is common to encode a stream of arrays of data elements, such as arrays of image data values (e.g. frames of video for display), so as to compress the data in order to reduce bandwidth and memory consumption. This is particularly desirable in data processing apparatus, e.g. of portable devices, where processing resources and power may be limited.

In order to encode a stream of arrays of data elements, each array of data elements is often divided into smaller "source" blocks of data elements and encoded on a block by block basis based on the difference between the source block and a "reference" block of data elements (which may be a predicted block of data elements) that is derived from one or more arrays of the stream of arrays.

The particular encoding options to use when encoding an array typically vary from region to region of the array. For example, the particular size of the source block(s), the particular way in which the reference block(s) are derived, etc., may be different for different regions of the array.

The particular encoding options to use when encoding an array are often selected using a process known as "Rate Distortion Optimisation" (RDO). The RDO process typically involves calculating cost values for various different sets of encoding options for a region and then selecting one or more particular sets of encoding options to use when encoding that region of the array that have an acceptably low cost value.

An example RDO process 100 for calculating a cost value for one particular set of encoding options under consideration is shown in FIG. 1.

The RDO process 100 of FIG. 1 initially comprises subtracting (−) the data elements of a particular source block (Src) for a region from the data elements of a particular reference (e.g. predicted) block (Pred) to generate an array of difference values (a set of "residuals"). A forward discrete cosine transformation process (F-DCT) is then applied to the array of difference values (residuals) to generate an array of frequency domain coefficients. A quantisation process (Q) is then applied to the array of frequency domain coefficients to generate an array of quantised frequency domain coefficients.

These steps essentially replicate the steps that would be applied prior to encoding the frequency domain coefficients for the source block, for example using entropy encoding. Thus, at this point, a bit count process (Bitcount) can be applied to the array of quantised frequency domain coefficients to determine a bit count cost that would be incurred when encoding the source block in accordance with the particular set of encoding options under consideration.

The bit count process may also take account of other bit costs, such as a measure of the bits needed to specify the prediction type being used, if desired.

A de-quantisation process (DQ) is then applied to the array of quantised frequency domain coefficients to generate an array of de-quantised coefficients. An inverse discrete cosine transformation process (I-DCT) is then applied to the array of de-quantised frequency domain coefficients to generate an array of reconstructed difference values. The array of reconstructed difference values is then added (+) to the reference (predicted) block to generate a reconstructed source block.

These steps essentially replicate the steps that would be applied so as to reconstruct the source block subsequent to decoding the encoded frequency domain coefficients for the source block. Thus, at this point, the data elements of the reconstructed source block are subtracted (−) from the data elements of the original source block to generate a set of error values and a sum-square distortion measuring process ($\Sigma x2$) is then applied to the set of error values to determine the total amount of distortion that would be introduced when encoding and then decoding the source block in accordance with the particular set of encoding options under consideration.

A cost value process (Cost) is then performed to determine an overall cost value for the particular set of encoding options from the bit count value and the distortion value.

The RDO process of FIG. 1 is then repeated in accordance with various different sets of encoding options for the region (e.g. different source block sizes, differently derived reference blocks, etc.) to produce a cost value for each of those different sets of encoding options. One or more sets of encoding options to use when encoding the region of the array are then selected based on the cost values for the different sets of encoding options.

The RDO process is also repeated across the array of data elements to select the sets of encoding options to use when encoding the remaining regions of the array of data elements.

As discussed above, one element of the RDO process is to determine a bit count cost for encoding the quantized frequency domain coefficients representing the differences (the residuals) for the block being encoded for the particular encoding option under consideration. This bit count cost effectively indicates how many bits will be included in the output encoded bit stream for conveying the necessary quantized frequency domain coefficient information to the decoder.

One set of information that needs to be indicated to the decoder for the quantized frequency domain coefficients is the locations of the non-zero coefficients (the coefficients having a value other than zero after the quantisation process) within the frequency domain (the so-called "significant coefficient map").

The effect of the transformation process on the 2D array of difference values is to generate a corresponding 2D array of frequency domain coefficients, with each position in the array of frequency domain coefficients corresponding to a particular frequency in the frequency domain. Each position in the frequency domain will have a corresponding value representing the value of the frequency domain coefficient for that position (location) in the frequency domain. The decoder needs to know and is provided with the locations (the positions) of the frequency domain coefficients that have non-zero values (that are other than zero) (after the quantisation process). (The actual values of the non-zero frequencies are sent separately to the locations (the positions) of the frequency domain coefficients that have non-zero values.)

The locations of the non-zero frequency domain coefficients may accordingly be represented, e.g., as a bit mask representing the array of positions in the frequency domain, with the positions in the bit mask being set accordingly to signal where the non-zero coefficients are. The encoded bit stream that is sent to the decoder accordingly needs to indicate the locations within the bit mask of the non-zero coefficients.

In some video encoding standards, such as HEVC, the encoding process for encoding the, e.g. bit masks of, non-zero coefficient locations uses an encoding process that is dependent on whether neighbouring blocks or sub-blocks have non-zero coefficients or not. For example, in the HEVC encoding standard, the index of the last non-zero coefficient is encoded and a bit mask of non-zero coefficients up to the last is encoded based on different CABAC (Context Adaptive Binary Arithmetic Coding) states for each 4×4 sub-block within the overall block being considered, where the state depends on whether the neighbouring 4×4 sub-blocks have non-zero coefficients or not. The CABAC states are updated serially and continuously, and also between blocks, and may do so for the whole frame. This then requires, for example, that the non-zero coefficients are encoded in the order of the scan, and that state information is maintained for sub-blocks within the block (and between blocks) during the encoding process.

All of this can make it more complex to determine a bit count cost for encoding the locations of the non-zero frequency domain coefficients, and can prevent, for example, it being possible to determine the bit count costs for blocks being encoded in parallel.

The Applicants accordingly believe that there remains scope for improved arrangements for determining a bit count cost for encoding the locations of the non-zero frequency domain coefficients in an encoding scheme that uses an array of frequency domain coefficients when selecting encoding options for encoding arrays of data elements.

BRIEF DESCRIPTION OF THE DRAWINGS

Various embodiments of the technology described herein will now be described by way of example only and with reference to the accompanying drawings, in which.

Figure 1:
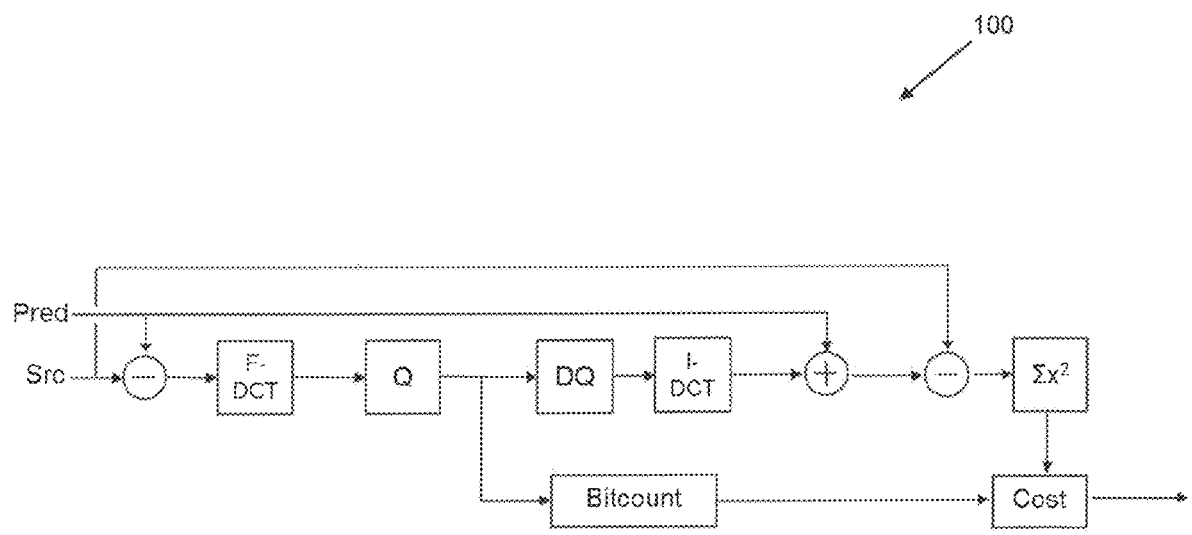
FIG. 1 illustrates a method of determining a cost value for a particular set of encoding options.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

A first embodiment of the technology described herein comprises a method of selecting encoding options to use when encoding an array of data elements of a stream of arrays of data elements, the method comprising:

in accordance with a particular set of encoding options:

generating an array of difference values that represents the difference between a source block of data elements of the array of data elements being encoded and a reference block of data elements derived from one or more arrays of data elements of the stream of arrays of data elements;

generating an array of frequency domain coefficients corresponding to the array of difference values by applying a forward transformation process to the array of difference values;

generating an array of quantized frequency domain coefficients by applying a quantization process to the array of frequency domain coefficients;

determining a bit count value for the particular set of encoding options for encoding the array of quantized frequency domain coefficients; and selecting, based on the bit count value, whether to encode the source block in accordance with the particular set of encoding options;

wherein:

the step of determining a bit count value for the particular set of encoding options for encoding the array of quantized frequency domain coefficients comprises:

estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements.

A second embodiment of the technology described herein comprises an apparatus for selecting encoding options to use when encoding an array of data elements of a stream of arrays of data elements, the apparatus comprising: difference value generating circuitry operable to generate an array of difference values that represents the difference between a source block of data elements of the array of data elements being encoded and a reference block of data elements derived from one or more arrays of data elements of the stream of arrays of data elements;

frequency domain coefficient generating circuitry operable to generate an array of frequency domain coefficients corresponding to the array of difference values by applying a forward transformation process to the array of difference values;

quantizing circuitry operable to generate an array of quantized frequency domain coefficients by applying a quantization process to the array of frequency domain coefficients;

bit count value determining circuitry operable to determining a bit count value for encoding the array of quantized frequency domain coefficients; and selection circuitry operable to select, based on the bit count value, a set of encoding options to use to encode the source block;

wherein:

the bit count value determining circuitry is operable to determine a bit count value for encoding the array of quantized frequency domain coefficients by:

estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements.

The technology described herein relates to an RDO process that is used when encoding arrays of data elements (e.g. frames of video for display). The technology described herein uses for the RDO process a bit count value for encoding an array of quantized frequency domain coefficients as a factor when selecting the particular encoding option (arrangement) to use when encoding a block of data elements of an array of data elements being encoded.

However, in the technology described herein, the bit count value for encoding the array of quantized frequency domain coefficients, and in particular the bit count value for encoding the locations of the non-zero quantized frequency domain coefficients, is estimated based on the number of non-zero quantized frequency domain coefficients in the array of quantized frequency domain coefficients determined for the block of data elements being considered (in contrast, e.g., to determining that bit count value based on the use of Context Adaptive Binary Arithmetic Coding, or another particular coding mechanism).

As will be discussed further below, the Applicants have found that estimating a bit count value for encoding the locations of the non-zero quantized frequency domain coefficients based on the number of non-zero (quantized) frequency domain coefficients can and does provide a suitable approximation of the actual number of bits that will be needed and used for that information, so as to be able to be used in an RDO process for selecting an encoding option to use for a block (and array) of data elements. Moreover, because the bit count value is estimated based on the number of non-zero frequency domain coefficients for the block of data elements being encoded, it can be determined without reference, e.g., to the encoding state of, or encoding options selected for, any other parts of the block of data elements or any other block of data elements, and without the need, e.g., to continuously track encoding state information or settings whilst performing the RDO process. It can also remove the need to process blocks or sub-blocks of data elements from an array of data elements in a predefined or particular scan order, for example.

As will be discussed further below, this all then facilitates performing the bit count value determination for the encoding of the locations of the non-zero quantized frequency domain coefficients in an RDO process in a less expensive (e.g. in terms of processing resources and power), and more flexible (e.g. in terms of being able to perform the estimations in parallel, and/or in distributed fashion), manner, but without any significant detrimental reduction in the effectiveness of the RDO process for selecting an appropriate encoding option for a given source block of data elements.

In any of the embodiments described herein the arrays of data elements of the stream of arrays may take any desired and suitable form. In embodiments, the arrays of data elements may each correspond to an array of data positions. The arrays of data elements or positions may correspond to all or part of a desired (e.g. image) output, such as a frame (e.g. for display). There may be any desired and suitable correspondence between the data elements or positions and the desired output. Thus, the data elements or positions of the arrays may each correspond to a pixel or pixels of a desired output. The arrays of data elements can be any desired and suitable size or shape in terms of data elements or positions, but are in an embodiment rectangular (including square). The data elements may also have any desired and suitable format, for example that represents image data values (e.g. colour values).

The arrays of data elements in an embodiment comprise respective video frames (images), in an embodiment of a stream (a sequence) of video frames, but other arrangements would be possible if desired.

In any of the embodiments described herein the source block may take any desired and suitable form. In embodiments, the source block can be any desired and suitable size or shape in terms of data elements or positions, but is in an embodiment rectangular (including square). For example, the source block may be 4×4, 4×8, 8×4, 8×8, 8×16, 16×8, 16×16, 16×32, 32×16, 32×32, 32×64, 64×32, 64×64 etc., data elements or positions in size. In embodiments, the source block may be one of plural blocks that the array of data elements may be divided into for encoding purposes. These plural blocks may be non-overlapping and/or may be similar or different in size or shape. The array of data elements can be any desired and suitable size, shape or configuration in terms of such blocks.

In any of the embodiments described herein the reference (predicted) block may be derived in any desired and suitable way. In embodiments, the reference block may be derived from the same array of data elements as the source block (using an "intra" mode). Alternatively, the reference block may be derived from one or more different arrays of data elements in the stream of arrays (using an "inter" mode). The one or more different arrays may comprise one or more previous arrays of data elements (using a "forwards" mode) and/or one or more subsequent arrays of data elements (using a "backwards" mode). In these embodiments, the reference block may be derived only from one or more previous arrays of data elements or only from one or more subsequent arrays of data elements (using a "uni-directional" mode). Alternatively, the reference block may be derived from both one or more previous arrays of data elements and from one or more subsequent arrays of data elements (using a "bi-directional" mode).

Where the reference block is derived from plural different arrays of data elements, data elements of the plural different arrays may be combined, e.g. averaged. In embodiments, the reference block for the source block may be derived in the same or in a substantially similar manner to another reference block that is derived for another source block that is adjacent to the source block (using a "merge" mode).

In embodiments, the method may further comprise performing, and the apparatus may further comprise processing circuitry configured to perform, a search process (e.g. an intra search and/or an inter search (as part of a motion estimation process)) that selects one or more candidate reference blocks. The one or more candidate reference blocks may be selected based on a similarity or difference metric, such as a sum of absolute differences (SAD) value, with respect to the source block. The reference block may be one of the one or more candidate reference blocks.

In embodiments, the method may further comprise performing, and the apparatus may further comprise processing circuitry configured to perform, a motion estimation process that determines one or more motion vectors. As will be appreciated, the one or more motion vectors may indicate how to derive the data elements of the reference block from the one or more arrays of data elements (e.g. by translating, rotating, scaling, etc.). The method may further comprise performing, and the apparatus may further comprise processing circuitry configured to perform, a motion compensation process that applies the one or more motion vectors to the one or more arrays of data elements to derive the reference block. Thus, in embodiments, the reference block may comprise a motion-compensated "prediction" block. As will be appreciated, using motion compensation can, for example, reduce the difference between the reference block and the source block. This in turn can reduce the bit count value and/or distortion value.

In embodiments in which the reference block for the source block is derived in the same or in a substantially similar manner to another reference block that is derived for another source block that is adjacent to the source block (using "merge" mode), deriving the reference block may comprise using the same vector to derive the reference block for the source block as the vector that is used to derive said another reference block for said another source block.

The reference block may correspond in size and/or shape (in terms of array elements) to the size and/or shape of the source block.

In any of the embodiments described herein, the particular set of encoding options may be characterised by any one or more encoding options as desired. The one or more encoding options that characterise the particular set of encoding options may include, for example, the particular size of the source block (in terms of data elements), the particular way in which the reference block is derived (e.g. the mode used, such as intra, inter, forward, backward, unidirectional, bi-directional, merge, etc. mode, and/or the motion vector used).

As will be discussed below, one or more different sets of encoding options may also be considered for selection when encoding the array of data elements. The one or more encoding options that characterise the particular set of encoding options may accordingly differentiate that particular set of encoding options from the one or more different sets of encoding options that are considered for selection.

In any of the embodiments described herein, the arrays of data elements may be provided in any desired and suitable way. Embodiments may comprise generating (at least some or all of) the data elements of the arrays. Embodiments may also or instead comprise reading in (at least some or all of) the data elements of the arrays, e.g. from memory.

The data elements of the arrays may be generated in any desired and suitable way. In embodiments, the data elements of the arrays may be generated by a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

In any of the embodiments described herein, generating the array of difference values can take any desired and suitable form. In embodiments, generating the array of difference values may comprise subtracting the values of the data elements of the source block respectively from the values of the corresponding (in terms of data position) data elements of the reference block, or vice versa.

In any of the embodiments described herein, the forward transformation process can take any desired and suitable form that generates an array of frequency domain coefficients. In embodiments, the forward transformation process may be substantially linear and/or orthogonal and/or invertible and/or discrete. The forward transformation process may be defined by the particular standard (e.g. HEVC standard) to be used when encoding the array of data elements. The forward transformation process may, for example, be a forward Discrete Cosine Transform (DCT).

The array of difference values may correspond in size and/or shape (in terms of array elements) to the size and/or shape of the source block and/or the reference block. The forward transformation process may comprise applying respective forward transformations to the rows of the array of difference values and then applying respective forward transformations to the columns of the resultant row-transformed array, or vice versa. For example, the forward transformation process may comprise applying respective forward transformations to each and every row of the array of difference values and then to each and every column of the resultant row-transformed array, or vice versa.

In any of the embodiments described herein, the quantisation process can take any desired and suitable form. In embodiments, applying the quantisation process may comprise respectively quantising (e.g. division by a quantisation constant and/or truncating and/or rounding) the frequency domain coefficients of the array of frequency domain coefficients. The quantisation may be defined by the particular standard (e.g. HEVC standard) to be used when encoding the array of data elements.

The array of frequency domain coefficients may correspond in size and/or shape (in terms of array elements) to the size and/or shape of the array of difference values, the source block, and/or the reference block.

The quantisation process may comprise quantising all of the frequency domain coefficients of the array of frequency domain coefficients.

However, in embodiments, applying the quantisation process may comprise quantising only a subset of the array of frequency domain coefficients.

In these embodiments, the subset of frequency domain coefficients that are quantised may be any desired and suitable subset (i.e. some but not all) of the array of frequency domain coefficients. The subset of frequency domain coefficients that are quantised may comprise coefficients that are expected to have a relatively greater influence on the bit count value and/or distortion value than the remaining coefficients that are not quantised. For example, the subset of frequency domain coefficients that are quantised may comprise a subset of relatively lower frequency coefficients of the array of frequency domain coefficients.

In embodiments, the frequency domain coefficients that did not have the quantisation process applied to them may be handled as desired. For example, those frequency domain coefficients may be set to a selected value, such as zero.

Correspondingly, the array of quantized frequency domain coefficients (i.e. the array of frequency domain coefficients after the quantization process has been applied to the array of frequency domain coefficients) may comprise frequency domain coefficients to all of which a quantization process has been applied, or an array of frequency domain coefficients in which some of the coefficients have had a quantization process applied to them, but others of the array of frequency domain coefficients may not have had a quantization process applied to them (which may, accordingly, retain their initial values, or may be set to a selected value, such as zero). (The frequency domain coefficients to which the quantization process has been applied may, accordingly, have a different value to their initial value (with the value being changed by the quantization process).)

The array of quantised coefficients may thus comprise an array of quantised (and, potentially, zeroed) coefficients. The array of quantised (and zeroed) coefficients may, and in an embodiment does, correspond in size and/or shape (in terms of array elements) to the size and/or shape of the array of frequency domain coefficients, the array of difference values, the source block, and/or the reference block.

The bit count value for encoding the locations in the frequency domain of the non-zero frequency domain coefficients in the array of quantized frequency domain coefficients can be estimated based on the number of non-zero coefficients in the array of quantized frequency domain coefficients in any suitable and desired manner.

As discussed above, the array of quantized frequency domain coefficients will, in effect, comprise a 2D array of frequency domain coefficients, with each coefficient position within that array having a given value (which will be zero or non-zero). The encoded data representing the data array (e.g. video frame) being encoded accordingly needs to indicate which positions in the frequency domain coefficient array have non-zero values. This information needs to be included in the encoded bit stream (set of bits) that is to be provided to the decoder for decoding the encoded array of data elements. The bit count value should accordingly be an estimate of the number of bits that will be required (that will be used) for indicating the locations of the non-zero frequency domain coefficients in the array of quantized frequency domain coefficients for the source block being encoded in the encoded bit stream (set of bits) that is to be provided to the decoder. (As discussed below, this bit count value may be, and is in an embodiment, used in combination with other bit costs to provide an overall bit cost that is considered.)

In an embodiment, the estimation process uses a binary entropy function that includes as a parameter (as an input) the number of non-zero frequency domain coefficients for the block being encoded to estimate the bit count value (the number of bits) for encoding the locations of the non-zero quantized frequency domain coefficients.

In an embodiment, the estimation of the bit count value (the number of bits) for encoding the locations of the non-zero frequency domain coefficients in the array of quantized frequency domain coefficients also uses a size of the array of quantized frequency domain coefficient positions for which the locations are to be indicated (e.g., and in an embodiment, in terms of the (total) number of different locations that there are in the array of frequency domain coefficients being considered).

In an embodiment, the size of the array (the number of possible frequency domain coefficient locations) is considered in terms of the length of the array, i.e. the number of coefficients in the coefficient scan order up to the highest non-zero coefficient frequency. The coefficient scan order will be, and is in an embodiment, a particular, in an embodiment selected, in an embodiment predefined, order for scanning (traversing) the frequency domain coefficients, and may be, e.g., and in an embodiment, dependent on (defined by) the particular encoding scheme (e.g. standard) being used, and may vary depending on the prediction type. The size (length) of the array will then be a function of the scan order and the location of the "highest" non-zero frequency coefficient.

Thus, in an embodiment, the estimation of the bit count value for indicating the locations of the non-zero frequency domain coefficients uses both the number of quantized frequency domain coefficients and the size of the array (e.g., and in an embodiment, in terms of the number of coefficient positions in the array) of quantized frequency domain coefficients that is being considered.

In an embodiment the estimation process only uses the number of non-zero quantized frequency domain coefficients and the size (the number of positions in) of the array of quantized frequency domain coefficients being considered (that the non-zero frequency domain coefficients being considered fall within).

Correspondingly, the estimation process in an embodiment uses a binary entropy function that takes as input parameters the number of non-zero frequency domain coefficients and the size of the array (the number of positions in the array) of frequency domain coefficients that is being considered (and takes only those parameters as inputs).

In an embodiment, the estimation process, e.g. the binary entropy function, is operable to provide, and provides, an estimate of the lower bound of the bit count value (the number of bits) that will be required for indicating the locations of the non-zero frequency domain coefficients in the array of quantized frequency domain coefficients. The Applicants have recognised in this regard that video encoding processors and codecs, for example, will usually attempt to use, and in general tend to approach using, the minimum or at least close to the minimum number of bits for encoding the locations of the non-zero quantized frequency domain coefficients, such that using an estimation process that estimates the lower bound for the number of bits that will need to be used will then provide an approximation for the bit count value that is a reasonable and suitable reflection of the actual bit count value (number of bits) that will be used when encoding that information.

In an embodiment, the estimation process assumes (uses) a particular, in an embodiment selected, in an embodiment predefined, distribution of the non-zero frequency domain coefficients within the array of quantized frequency domain coefficients being considered. In an embodiment, the estimation process (e.g. binary entropy function) assumes that the non-zero frequency domain coefficients will be uniformly distributed within the array of quantized frequency domain coefficients being considered (and thus is based on there being a uniform distribution of the non-zero frequency domain coefficients within the array of quantized frequency domain coefficients being considered).

Thus, in an embodiment, the estimation process estimates the number of bits needed to encode a uniform k-sized subset from an n-sized ground set (where k is the number of non-zero frequency domain coefficients, and n is the number of frequency domain coefficient positions in the quantized frequency domain coefficient array being considered (i.e. the size of the quantized frequency domain coefficient array being considered)).

Thus, in an embodiment, the estimation process assumes that there are (n choose k) k-sized subsets of an n-sized ground set and so determines that the bit count value will be log 2 (n choose k) bits.

Correspondingly, in an embodiment, a binary entropy function of the following form is used:

bit count value (number of bits)=$(-p*\log_2(p)-(1-p)*\log_2(1-p))*n$ where:

k is the number of non-zero frequency domain coefficients, and n is the number of frequency domain coefficient positions in the quantized frequency domain coefficient array being considered.

In an embodiment, the bit count value for encoding the locations of the non-zero frequency domain coefficients for a given source block of data elements is estimated using a single estimation process for the block as a whole, irrespective of the size of the source block of data elements (and correspondingly irrespective of the size of the array of quantized frequency domain coefficients).

In an embodiment, the method of the technology described herein operates to (and the apparatus of the technology described herein is accordingly configured to) estimate bit count values for encoding the location of the non-zero frequency domain coefficients for a particular, in an embodiment selected, in an embodiment predetermined, quantized frequency domain coefficient array size, with arrays of (quantized) frequency domain coefficients (and thus source block of data elements) that are larger than that particular array size then being processed as a plurality of sub-arrays (sub-blocks) making up the overall array of frequency domain coefficients (with each sub-array (in an embodiment) corresponding to the particular array size the estimation process operates on).

In this case therefore, a given array of frequency domain coefficients for a source block of data elements will be processed as (and divided into), if necessary, a plurality of sub-arrays, each sub-array having a particular size. Bit count values are in an embodiment then estimated for each sub-array individually (in the manner of the technology described herein), with the bit count value for the array of frequency domain coefficients then being based on the bit count values determined for the individual sub-arrays. In these arrangements, the individual sub-array bit count values are in an embodiment combined (e.g., and in an embodiment, summed) to provide a bit count value estimate for the array of frequency domain coefficients for the source block of data elements as a whole.

Thus, in an embodiment, the technology described herein comprises, and the apparatus of the technology described herein is configured to, estimate a bit count value for encoding the locations of the non-zero quantized frequency domain coefficients for a source block of data elements being encoded by:

for each of a plurality of sub-arrays making up the array of frequency domain coefficients for the source block of data elements, estimating a bit count value for the sub-array for encoding the locations of the non-zero quantized frequency domain coefficients within the sub-array; and combining the sub-array estimates to provide an estimate of the bit count value for encoding the locations of the non-zero quantized frequency domain coefficients in the array of quantized frequency domain coefficients for the source block of data elements.

In these arrangements, the estimate of the bit count value for a given sub-array should be, and is in an embodiment, determined in the manner discussed above, i.e. based on a number of non-zero quantized frequency domain coefficients in the sub-array and, e.g., and in an embodiment, by using a binary entropy function to estimate a lower bound for the number of bits needed to encode the locations of that number of non-zero quantized frequency domain coefficients in the sub-array (e.g., and in an embodiment, assuming a uniform distribution of the positions of the non-zero quantized frequency domain coefficients within the sub-array).

In these arrangements, the sub-array size and/or shape (configuration) (the particular sub-array size and/or shape that the estimations are determined for) can be selected as desired. The sub-array(s) are in an embodiment rectangular, and in an embodiment square. In an embodiment their size and/or shape is based on the size and/or shape of source block that the video encoding scheme in question uses or is operable on, and/or on any sub-block size and/or shape used for encoding the locations of non-zero quantized frequency domain coefficients that the encoding scheme may use. In an embodiment, a sub-array of 4×4 is used, particularly when using the HEVC video encoding standard. Other arrangements would, of course, be possible.

Where a larger array of quantized frequency domain coefficients is processed as a plurality of sub-arrays, all (each) of the plural sub-arrays making up the overall array of quantized frequency domain coefficients that is being considered are in an embodiment all (each) the same size and configuration (shape), and are in an embodiment each rectangular, and in an embodiment square. The overall array of quantized frequency domain coefficients is in an embodiment processed as a plurality of non-overlapping sub-arrays (i.e. such that the sub-arrays tessellate to (exactly) cover the array of frequency domain coefficients without overlapping).

When estimating a bit count value for a larger array of frequency domain coefficients by estimating bit count values for sub-arrays within that larger array, it would be possible to estimate a bit count value for each sub-array making up the larger array. However, in an embodiment, bit count values are only estimated for those sub-arrays within the larger array that contain non-zero quantized frequency domain coefficients (as any sub-arrays that only contain frequency domain coefficients that have a value of zero will not incur any bit cost (use any bits) for indicating the locations of the non-zero frequency domain coefficients in the encoded bit stream). Thus the process in an embodiment comprises estimating a bit count value for (and only for) those sub-arrays within a larger array that contain non-zero frequency domain coefficients.

In these arrangements, as well as estimating (and combining, e.g. summing) bit count values for each sub-array that contains non-zero quantized frequency domain coefficients (in an embodiment based on the number of non-zero quantized frequency domain coefficients in the sub-array) to estimate the overall bit count value for encoding the locations of the non-zero quantized frequency domain coefficients for the source block of data elements being considered, a bit count value (bit cost) is also determined for indicating the locations of those sub-arrays within the larger array that contain non-zero quantized frequency domain coefficients. This bit count value (bit cost) is in an embodiment then used with, and in an embodiment combined with (and in an embodiment added to), the individual sub-array bit count values, so as to provide an overall bit count value (bit cost) for encoding the locations of the non-zero quantized frequency domain coefficients for the source block of data elements being considered.

For this estimate, the sub-arrays making up the overall array are correspondingly in an embodiment considered as being a respective array of sub-arrays, with the locations of the sub-arrays having non-zero quantized frequency domain coefficients within the array of sub-arrays then needing to be indicated and encoded in the encoded bit stream. In this case, a similar estimation process to that discussed above for encoding the locations of the non-zero frequency domain coefficients within an array of frequency domain coefficients is in an embodiment used to estimate the bit count value (the bit cost) for encoding the locations of the sub-arrays having non-zero quantized frequency domain coefficients within the "array" of sub-arrays.

Thus, in these arrangements, the estimate of the bit count value for encoding the locations of the sub-arrays having non-zero quantized frequency domain coefficients within the "array" of sub-arrays should be, and is in an embodiment, determined in the manner discussed above, i.e. based on the number of sub-arrays in the overall array that contain non-zero quantized frequency domain coefficients and, e.g., and in an embodiment, by using a binary entropy function to estimate a lower bound for the number of bits needed to encode the locations of that number of sub-arrays having non-zero quantized frequency domain coefficients (e.g., and in an embodiment, assuming a uniform distribution of the positions of the sub-arrays containing non-zero quantized frequency domain coefficients within the overall array).

Thus, in an embodiment, the technology described herein comprises, and the apparatus of the technology described herein is configured to, estimate a bit count value for encoding the locations of the non-zero quantized frequency domain coefficients for a source block of data elements being encoded by:

for each of a plurality of sub-arrays making up the array of frequency domain coefficients for the source block of data elements, estimating a bit count value for the sub-array for encoding the locations of the non-zero quantized frequency domain coefficients within the sub-array;

estimating a bit count value for encoding the locations within the array of frequency domain coefficients for the source block of data elements of the sub-arrays containing non-zero quantized frequency domain coefficients; and combining the sub-array estimates and the bit count value estimate for encoding the locations of the sub-arrays containing non-zero quantized frequency domain coefficients within the array of frequency domain coefficients for the source block of data elements, to provide an estimate of the bit count value for encoding the locations of the non-zero quantized frequency domain coefficients in the array of quantized frequency domain coefficients for the source block of data elements.

It would be possible to derive the estimate (to calculate the estimate) of a bit count value for a given array or sub-array of quantized frequency domain coefficients in use. Alternatively, e.g. particularly in the case where the bit count values are going to be determined for predefined array (sub-array) sizes, the bit count values for respective numbers of non-zero quantized frequency domain coefficients within a particular sized array could be determined in advance and stored, and then looked up in use based on the number of non-zero quantized frequency domain coefficients in the array (sub-array) in question (and in an embodiment, this is what is done).

Thus, in an embodiment, the technology described herein comprises, and the apparatus of the technology described herein is configured to, estimate a bit count value for encoding the locations of the non-zero quantized frequency domain coefficients for a source block of data elements being encoded by:

determining the number of non-zero quantized frequency domain coefficients in an array or sub-array of quantized frequency domain coefficients; and retrieving a predetermined bit count value corresponding to the determined number of non-zero quantized frequency domain coefficients to use as the estimate of the bit count value for encoding the locations of the non-zero quantized frequency domain coefficients for the array or sub-array in question.

The technology described herein also extends to the particular bit count value estimation process itself.

Thus, a further embodiment of the technology described herein comprises a method of determining a bit count value for encoding an array of quantized frequency domain coefficients for an encoding process that uses an array of quantized frequency domain coefficients for encoding an array of difference values that represent the difference between a source block of data elements and a reference block of data elements, the method comprising:

estimating a bit count value for encoding the locations of the non-zero quantized frequency domain coefficients in an array of quantized frequency domain coefficients based on the number of non-zero frequency domain coefficients in the array of quantized frequency domain coefficients.

A further embodiment of the technology described herein comprises an apparatus for determining a bit count value for encoding an array of quantized frequency domain coefficients for an encoding process that uses an array of quantized frequency domain coefficients for encoding an array of difference values that represent the difference between a source block of data elements and a reference block of data elements, the apparatus comprising:

bit count value estimating circuitry configured to estimate a bit count value for encoding the locations of the non-zero quantized frequency domain coefficients in an array of quantized frequency domain coefficients based on the number of non-zero frequency domain coefficients in the array of quantized frequency domain coefficients.

As will be appreciated by those skilled in the art, these embodiments of the technology described herein can, and in an embodiment do, include any one or more or all of the features of the technology described herein, as appropriate.

Thus, for example, the bit count value for encoding the array of quantized frequency domain coefficients is in an embodiment determined by determining bit count value estimates for a plurality of sub-arrays making up the overall array of quantized frequency domain coefficients, and then combining those sub-array estimates to provide a bit count value estimate for the overall array of quantized frequency domain coefficients.

Similarly, the bit count value estimate for the array or sub-arrays can be, and is in an embodiment, determined in the manner discussed above, e.g., and in an embodiment, based on the number of non-zero coefficients in the array or sub-array and the size of the array or sub-array, and in an embodiment estimates a lower bound for the number of bits that would be used for encoding the locations of the non-zero coefficients.

The bit count value (the bit cost) for encoding the quantized frequency domain coefficients that is used when selecting the encoding option to use could be based only on the estimated bit count value for indicating the locations of the non-zero quantized frequency domain coefficients.

However, in an embodiment, the bit count value also takes account of (also includes) a bit cost for encoding other information relating to the quantized frequency domain coefficients, and in particular includes (and takes account of)

one or more of, and in an embodiment both of: a bit cost for specifying the location of the highest frequency non-zero quantized frequency domain coefficient (in the scan order of the frequencies, as discussed above); and a bit cost for specifying the values of all of (of each of) the non-zero quantized frequency domain coefficients in the array of quantized frequency domain coefficients for the source block being encoded.

These other bit costs can be estimated and derived in any suitable and desired manner, for example using existing or known techniques for that purpose.

Thus, in an embodiment, a bit count value for encoding the array of quantized frequency domain coefficients is determined based on bit count values for encoding three elements of information: the values of all the non-zero quantised frequency domain coefficients; the locations of the non-zero coefficients within the frequency domain (the so-called "significant coefficient map"); and the location of the highest frequency non-zero coefficient.

Other bit count costs, such as a bit cost for specifying the prediction type could also be considered (taken into account), if desired.

In an embodiment, as well as being based on a bit count value for (the number of bits needed for) encoding the array of quantized frequency domain coefficients, the selection of whether to encode the source block in accordance with the particular set of encoding options takes account of, and is based on, a distortion value for the particular set of encoding options being considered.

Thus, in an embodiment, the method of the technology described herein comprises (and the apparatus of the technology described herein is configured to) selecting, based on the estimated bit count value and a distortion value, whether to encode the source block in accordance with the particular set of encoding options.

The distortion value can be determined in any suitable and desired manner. It is in an embodiment indicative of an amount of distortion that would be introduced when encoding and then decoding the source block in accordance with the particular set of encoding options under consideration.

In an embodiment, the distortion value is based on a set of error values that represent the difference between the original source block, and a reconstructed version of that source block following encoding and then decoding the source block in accordance with the particular set of encoding options under consideration (e.g. as is shown in the RDO process of FIG. 1).

In these embodiments, the set of error values could, accordingly, be based on a comparison of the reconstructed source block with the original source block.

Thus in this case, the generated array of quantized frequency domain coefficients may be subjected to a de-quantization process to generate an array of de-quantized frequency domain coefficients, an inverse transformation process may then be applied to the array of de-quantized frequency domain coefficients to generate an array of reconstructed difference values, and the array of reconstructed difference values may then be combined with the reference block to generate a reconstructed source block (e.g. by adding together the difference values of the array of reconstructed difference values and the respective values of the corresponding (in terms of data position) data elements of the reference block).

The reconstructed source block could then be compared with (e.g. subtracted from) the original source block to generate a set of error values representing the difference between the original source block, and a reconstructed version of that source block. In these embodiments, generating the set of error values may accordingly comprise subtracting the values of the data elements of the reconstructed source block respectively from the values of the corresponding (in terms of data position) data elements of the source block, or vice versa.

Other arrangements for determining a set of error values to be used to determine a distortion value could be used if desired. For example, a set of error values to be used to determine the distortion value could be generated from the array of de-quantized frequency domain coefficients and the generated array of frequency domain coefficients (such that the set of error values will represent the difference between the generated array of frequency domain coefficients and the array of de-quantized frequency domain coefficients, for example, rather than generating the set of error values from a reconstructed source block and the original source block itself).

In this case, generating the set of error values may comprise subtracting the values of the de-quantised coefficients of the array of de-quantised coefficients respectively from the values of the corresponding (in terms of data position) frequency domain coefficients of the array of frequency domain coefficients, or vice versa.

In these arrangements, the de-quantisation process can take any desired and suitable form, for example that corresponds to the quantisation process. In embodiments, the de-quantisation process may comprise respectively de-quantising (e.g. multiplying by a quantisation constant and/or padding with zeros) the quantised (and zeroed) coefficients of the array of quantised frequency domain coefficients. The de-quantisation may be defined by the particular standard (e.g. HEVC standard) to be used when encoding the array of data elements.

The array of de-quantised (and zeroed) frequency domain coefficients may correspond in size and/or shape (in terms of array elements) to the size and/or shape of the array of quantised (and zeroed) coefficients, the array of frequency domain coefficients, the array of difference values, the source block, and/or the reference block.

Correspondingly, in these embodiments, the inverse transformation process (if applied) can take any desired and suitable form that corresponds to the forward transformation process. In embodiments, the inverse transformation process may be substantially linear and/or orthogonal and/or invertible and/or discrete. The inverse transformation process may be defined by the particular standard (e.g. HEVC standard) to be used when encoding the array of data elements. The inverse transformation process may, for example, be an inverse Discrete Cosine Transform (DCT), In any of the embodiments described herein, the set of error values may comprise an array of error values. The set of error values may correspond in size and/or shape (in terms of array elements) to the size and/or shape of the array of de-quantised (and zeroed) frequency domain coefficients, the array of quantised (and zeroed) frequency domain coefficients, the array of frequency domain coefficients, the array of difference values, the source block, and/or the reference block.

The distortion value for the particular set of encoding options can be determined from the set of error values in any desired and suitable way. In embodiments, determining the distortion value may comprise determining a sum-square of the error values of the set of error values.

In any of the embodiments described herein, selecting, based on the bit count value, e.g. and the distortion value, whether to encode the source block in accordance with the particular set of encoding options can be performed in any desired and suitable way. In embodiments, selecting whether to encode the source block in accordance with the particular set of encoding options may comprise determining a cost value for the particular set of encoding options based on the bit count value, e.g. and the distortion value, and selecting, based on the cost value, whether to encode the source block in accordance with the particular set of encoding options. Determining the cost value may comprise combining the bit count value and the distortion value. The combination of the bit count value and the distortion value may be any suitable and desired combination, such as a weighted combination of the bit count value and the distortion value.

In embodiments, the particular set of encoding options may be selected when the bit count value and/or the distortion value and/or the cost value is the lowest such value of plural such values determined for respective different sets of encoding options. The particular set of encoding options may also or instead be selected when the bit count value and/or the distortion value and/or the cost value is below a selection threshold for such a value.

As will be appreciated, the selecting processes that are performed in accordance with the particular set of encoding options may, in practice, be performed respectively for each (e.g. every) one of plural different sets of encoding options. This can allow, for example, for a more suitable set of encoding options to be selected. As discussed above, the different sets of encoding options may be characterised by, and may differ in respect of, one or more encoding options as desired. As discussed above, the one or more encoding options that characterise the sets of encoding options may include, for example, the particular size of the source block (in terms of data elements), the particular way in which the reference block is derived, etc.

In any of the embodiments described herein, selecting a set of encoding options to use when encoding the array of data elements may be followed by performing an encoding process that encodes the source block in accordance with the selected set of encoding options. Thus, the data processing apparatus may comprise processing circuitry configured to perform an encoding process that encodes a source block in accordance with a selected set of encoding options.

The encoding process may comprise, when a particular set of encoding options is selected for use when encoding the source block, encoding the source block in accordance with the selected particular set of encoding options. Alternatively, the encoding process may comprise, when a particular set of encoding options is not selected for use when encoding the source block, not encoding the source block in accordance with the particular set of encoding options. In this case, the region of the array of data elements that corresponds to the source block may be encoded in accordance with a selected different set of encoding options.

The encoding process can take any desired and suitable form. The encoding process may be defined by the standard (e.g. HEVC standard) to be used when encoding the array of data elements. In embodiments, the encoding process may comprise entropy encoding.

As will be appreciated, the encoding process may comprise generating an array of difference values that represents the difference between the source block and the reference block for the selected set of encoding options, generating an array of frequency domain coefficients for the array of difference values by applying a (e.g. complete) forward transformation process to the array of difference values, and/or generating an array of quantised coefficients by applying a (e.g. complete) quantisation process to the array of frequency domain coefficients. The (e.g. entropy) encoding may then be performed on the array of quantised coefficients.

As will be appreciated, any of the processes that are performed in respect of a source block that corresponds to a region of the array may, in practice, be performed respectively for each (e.g. every) one of plural source blocks that correspond to the region or that correspond respectively to plural (different) regions of the array.

As will also be appreciated, any of the processes that are performed in respect of an array may, in practice, be performed respectively for each (e.g. every) one of plural arrays of the stream of arrays.

In any of the embodiments or embodiments described herein, once encoded, the encoded source block(s) and/or encoded array and/or encoded stream of arrays may be used in any desired and suitable way. For example, the encoded source block(s) and/or encoded array and/or encoded stream of arrays may be output, e.g. stored in memory and/or streamed to another device. Thus, the data processing apparatus may comprise output circuitry (e.g. write out circuitry) configured to output (e.g. write out) the encoded source block(s) and/or encoded array and/or encoded stream of arrays, e.g. to memory or to another device. Any motion vectors, if used, may also be output in a similar way.

The encoded source block(s) and/or encoded array and/or encoded stream of arrays may later be retrieved and/or received, e.g. for decoding. Thus, the data processing apparatus may comprise input circuitry (e.g. read in circuitry) configured to input (e.g. read in) the encoded source block(s) and/or encoded array and/or encoded stream of arrays, e.g. from memory. Any motion vectors, if used, may also be input in a similar way.

Encoding a source block may be followed by a decoding process that decodes the encoded source block. Thus, the data processing apparatus may comprise processing circuitry configured to perform a decoding process that decodes an encoded source block. The decoding process can take any desired and suitable form, for example that corresponds to the encoding process that was used when encoding the encoded source block. The decoding process may be defined by the standard (e.g. HEVC standard) that was used when encoding the array of data elements. For example, the decoding process may comprise entropy decoding.

As will be appreciated, the (e.g. entropy) decoding may comprise producing an array of quantised coefficients for the encoded source block. The decoding process may then comprise generating an array of de-quantised coefficients by applying a (complete) de-quantisation process to the array of quantised coefficients, generating an array of reconstructed difference values by applying a (complete) inverse transformation process to the array of de-quantised coefficients, and/or generating a reconstructed source block by combining the array of reconstructed difference values and the reference block. Combining the array of reconstructed difference values and the reference block may comprise adding together the difference values of the array of reconstructed difference values and the respective values of the corresponding (in terms of data position) data elements of the reference block.

As discussed above, a reference block may comprise a motion compensated prediction block. The decoding may accordingly further comprise a motion compensation process that applies one or more motion vectors to one or more decoded arrays of data elements to derive the reference block.

In any of the embodiments described herein, once determined, the data elements of the decoded source block may be used in any desired and suitable way.

For example, the data elements of the decoded source block may be output (e.g. by an output (e.g. display) processor), e.g. for display. In these embodiments, the arrays of data elements may correspond to images, e.g. frames of image data, and the data elements may correspond to a pixel or pixels.

As will be appreciated, any of the processes that are performed in respect of an encoded source block of an encoded array may, in practice, be performed respectively for each (e.g. every) one of plural encoded source blocks of the encoded array.

As will also be appreciated, any of the processes that are performed in respect of an encoded array of an encoded stream of arrays may, in practice, be performed respectively for each (e.g. every) one of plural encoded arrays of an encoded stream of arrays.

The processes described herein in any embodiment may be performed by any desired and suitable apparatus. For example, the processes described herein in any embodiment may be performed by a video processor (codec). The data processing apparatus described herein in any embodiment may therefore comprise or may be a video processor. Thus, the processing circuitry, output circuitry or write out circuitry, input circuitry or read in circuitry, etc. described herein in any embodiment may form part of a video processor. The data processing apparatus described herein in any embodiment may comprise, or may be, or may form part of, a system on chip (SoC).

The memory referred to herein may be any desired and suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

The technology described herein can correspondingly be used with and for any suitable and desired encoding (e.g. video encoding) scheme (and standard). In an embodiment it is used with and for the HEVC encoding standard.

In an embodiment, the various functions of the technology described herein are carried out on a single data (e.g. image) processing platform that provides and/or uses the arrays of data elements.

As will be appreciated by those skilled in the art, the data processing apparatus of the technology described herein may be part of an overall data processing system that includes, for example, a host (e.g. central) processor. The host processor may, for example, execute applications that require data processing by the data processing apparatus. The host processor may send appropriate commands and data to the data processing apparatus to control it to perform the data processing operations and to generate and/or use an output required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, units and "means" of the technology described herein may comprise a suitable processor or processors, controller or controllers, functional units, circuits, circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The various steps or functions, etc., of the technology described herein may be duplicated and/or carried out in parallel on a given processor. Equally, the various processing stages may share processing circuits/circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein relate to arrangements that comprise selecting encoding options to use when encoding an array of data elements. Various embodiments of the technology described herein will now be described in the context of the encoding frames of image data for display. However, the concepts described herein can equally be applied to contexts in which arrays of other types of data are to be encoded.

Figure 2:
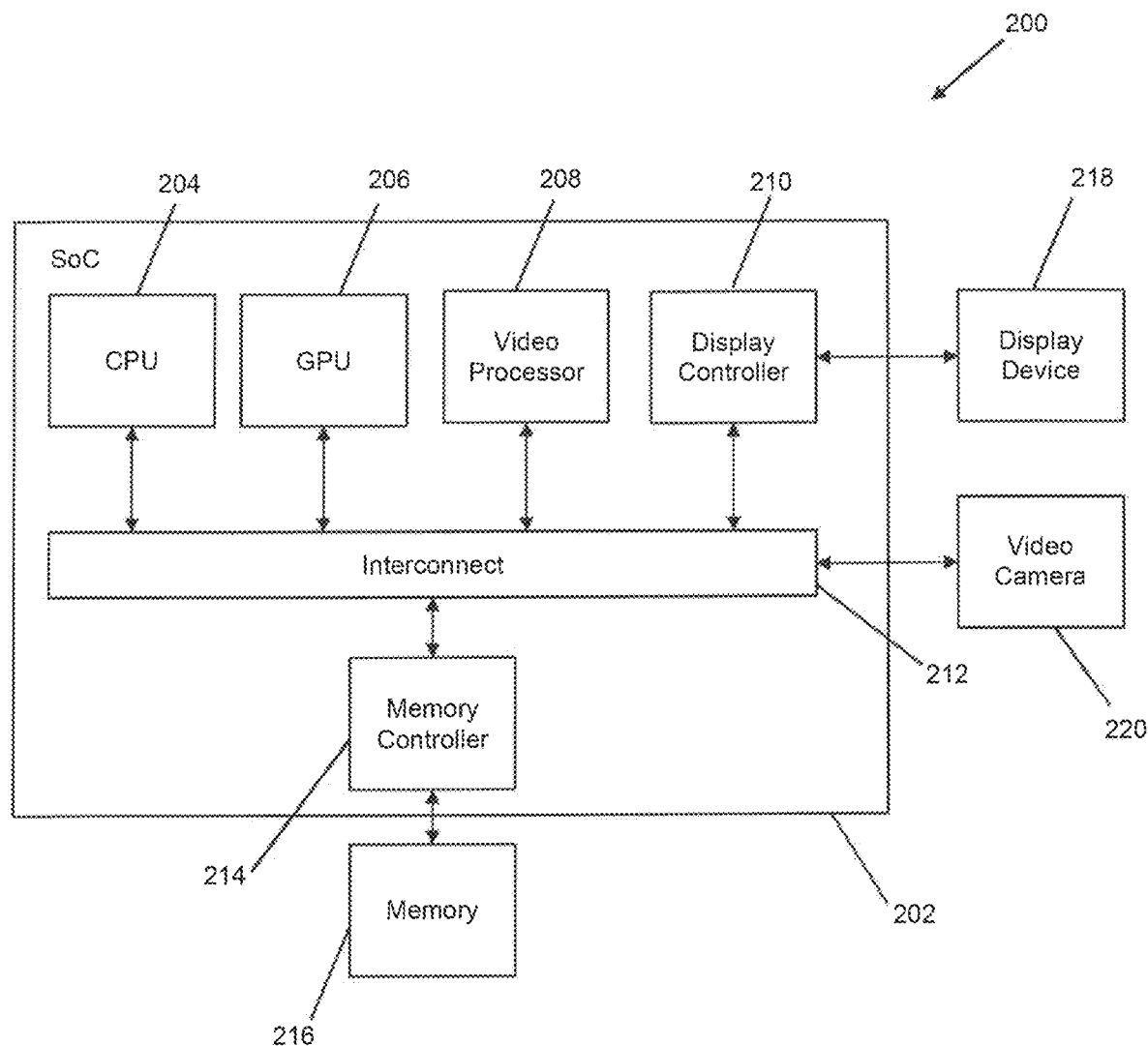
FIG. 2 shows schematically a data processing system according to embodiments of the technology described herein.

FIG. 2 shows schematically an embodiment of a data processing system 200 that can provide and use data arrays, such as frames for display, that have been encoded in the manner of the present embodiments.

In this embodiment, the system 200 comprises a data processing apparatus in the form of a system on chip (SoC) 202. The system 200 also comprises off-chip (main) memory 216, a display device 218 and a video camera 220.

The SoC 202 comprises a central processing unit (CPU) 204, a graphics processing unit (GPU) 206, a video processor 208, a display controller 210, an interconnect 212 and a memory controller 214.

As is shown in FIG. 2, the CPU 204, GPU 206, video processor 208, and display controller 210 communicate with each other via the interconnect 212 and with the memory 216 via the interconnect 212 and memory controller 214. The display controller 210 also communicates with the display device 218. The video camera 220 also communicates with the SoC 202 via the interconnect 212.

In the following embodiments, the video processor 208 reads in image data from memory 216, encodes the image data, and then outputs that encoded image data, e.g. for storage in memory 216 or for streaming to another device. The encoded image data can later be retrieved and decoded, e.g. by the video processor 208, or received and decoded by another device. The decoded image data can then be output, e.g. by the display controller 210 to the display device 218 or by another device, for display.

Figure 3:
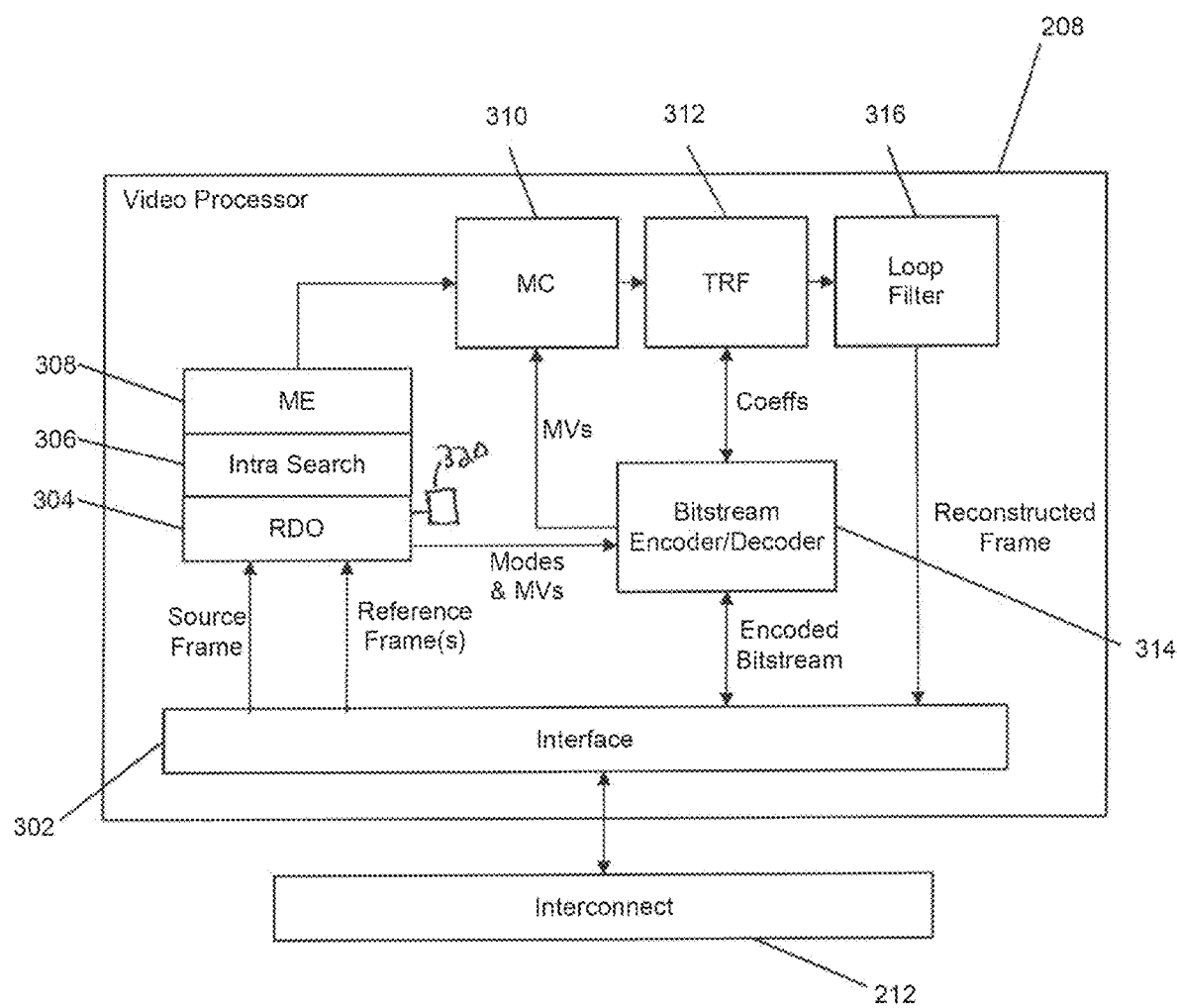
FIG. 3 shows schematically a video processor according to embodiments of the technology described herein.

FIG. 3 shows further details of a video processor 208 that can be used to encode and decode a stream of arrays of data elements, such as frames for display, in the manner of the present embodiments.

In this embodiment, the video processor 208 comprises an interface 302 that can provide, via the interconnect 212, a current "source" frame to be encoded. In a similar manner, the interface 302 can provide, via the interconnect 212, one or more previous and/or subsequent "reference" frames that may be used when encoding the source frame.

In this embodiment, the source frame is divided into plural source blocks to be encoded on a block by block basis. Each source block is initially 16×16 data elements (pixels) in size. Each source block can, however, be further divided into two 16×8 or 8×16 source blocks or four 8×8 source blocks, if that would provide for less costly encoding. Each of these smaller source blocks can also be further divided into two 8×4 or 4×8 source blocks or four 4×4 source blocks, if that would provide for less costly encoding. Other source block sizes could of course be used as desired.

In this embodiment, a source block can be encoded using another block within the source frame itself, i.e. using "intra" mode encoding. The video processor 208 accordingly comprises inter search circuitry 306 that, for a given source block in the source frame, searches within the source frame itself for one or more suitable candidate reference blocks to consider using when encoding that source block. The one or more candidate reference blocks may be selected using any suitable metric that indicates the similarity or difference between the source block and the potential reference block in question, such as a sum of absolute differences (SAD) value.

In this embodiment, the one or more reference frames are also divided into plural blocks (which may correspond in size to the source block) that may be used when encoding the source frame, i.e. using "inter" mode encoding. The video processor 208 accordingly comprises ME (motion estimation) circuitry 308 that, for a given source block in the source frame, searches within the one or more reference frames for one or more suitable candidate reference blocks to consider using when encoding that source block. A candidate reference block can be derived by using a motion vector (MV) that describes how a particular block of a particular frame is mapped (e.g. by translation, rotation and/or scaling) to that candidate reference block. Again, the one or more candidate reference blocks may be selected using any suitable metric that indicates the similarity or difference between the source block and the potential reference block in question, such as a sum of absolute differences (SAD) value.

RDO (Rate Distortion Optimisation) circuitry 304 then performs an RDO process in respect of each source block using the candidate reference blocks for that source block. In this embodiment, the output of the RDO circuitry 304 comprises a selected set of encoding options for a particular source block (e.g. having a particular size in terms of data elements of the frame). In this embodiment, the selected set of encoding options further comprises a particular way to derive a reference block for that particular source block (e.g. the encoding mode to be used, such as intra, inter, unidirectional, bidirectional, merge, etc., mode, and/or the motion vector to be used).

An RDO process in which the video processor 208 selects a set of encoding options to use when encoding an array of data elements of a stream of arrays of data elements, such as a stream of frames of image data, will now be described in more detail with reference to FIG. 4.

In step 402, the RDO circuitry 304 of the video processor 208 selects a set of encoding options to consider for a region of the current source frame. As discussed above, the set of encoding options can be for a particular source block (e.g. having a particular size in terms of data elements of the frame) and/or can include, for example, particular motion vectors and/or a particular encoding mode (intra, inter, forward, backward, uni-directional, bi-directional, merge, etc. mode) used to derive the reference block for that particular source block.

Then, in step 404, the RDO circuitry 304 of the video processor 208 determines a cost value for the set of encoding options. Further details of processes for determining a cost value for a particular set of encoding options (e.g. as per step 404) are provided below.

Then, in step 406, the RDO circuitry 304 of the video processor 208 determines whether or not all sets of encoding options have been considered for the region.

If there are still sets of encoding options to be considered, then the next set of encoding options is selected at step 408 and the process returns to step 404 to determine a cost value for that next set of encoding options. For example, differently sized source block(s) and/or differently derived reference block(s) may be considered.

If all of the sets of encoding options have been considered then, in step 410, one or more of the sets of encoded options are selected based on the respective cost values for the different sets of encoding options. In this embodiment, the set(s) of encoding options with the lowest cost value(s) are selected.

Next, in step 412, the video processor 208 encodes each of the one or more source blocks for the region in accordance with the selected set of encoding options for that source block. Further details of encoding a source block (e.g. as per step 412) are provided below.

Then, in step 414, the video processor 208 writes out the one or more encoded source block to memory 216.

Figure 4:
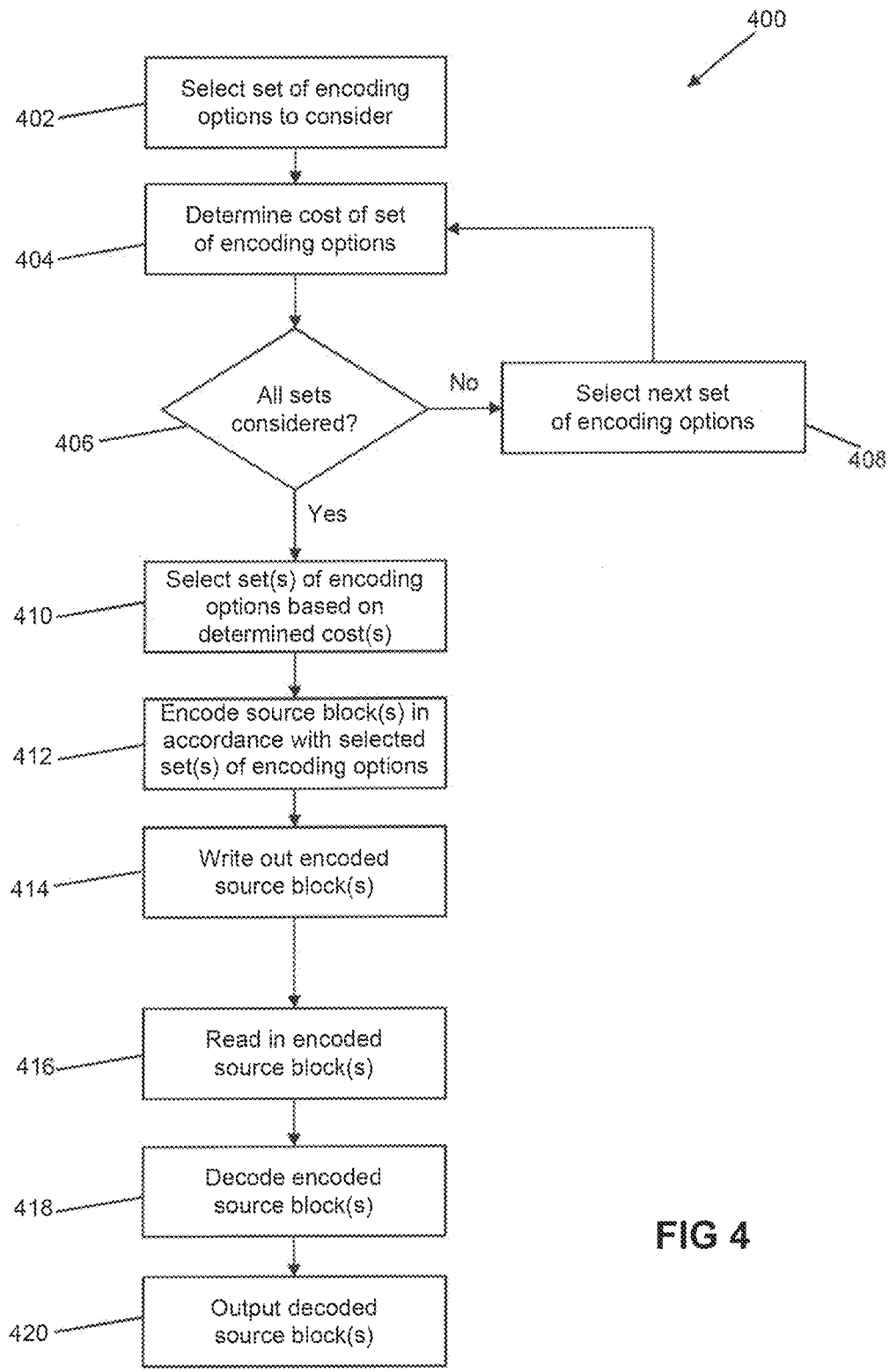
FIG. 4 shows a method of selecting and using a set of encoding options based on a cost value according to embodiments of the technology described herein.

As will be appreciated, the above steps of FIG. 4 would be performed in respect of each region of the source frame and in respect of each frame of the stream of frames so as to generate and store an encoded stream of frames.

At a later time, when it is desired to decode the source block, the video processor 208 can read in the encoded source block from memory 216 in step 416. Then, in step 418, the video processor 208 decodes the encoded source block. Further details of decoding an encoded source block (e.g. as per step 418) are provided below.

Finally, in step 420, the video processor 208 outputs the decoded source block, for example to the display processor 210 for display on the display device 218.

Again, as will be appreciated, the above steps of FIG. 4 would be performed in respect of each encoded source block of each encoded frame so as to generate and output a decoded stream of frames.

Various alternative embodiments to the process of FIG. 4 are also contemplated.

For example, the video processor 208 may select a set of encoding options to consider and may determine a cost value for that set of encoding options. The set of encoding options may be selected for use when encoding the array of data elements if the cost value is below a threshold value. If the cost value is not below the threshold value, then the video processor 208 may repeat the process with a different set of encoding options. This process may continue until a set of encoding options having a suitably low cost value is found or until a termination condition is reached.

For another example, instead of being written out to memory, the encoded stream of arrays may be streamed to another device. That other device may then decode the encoded stream of arrays and output the decoded stream of arrays, e.g. for display.

As discussed above, the technology described herein and thus the present embodiments relate in particular to the process of determining which encoding option to use when encoding a given region of a data array, such as a video frame, to be encoded (i.e. the process of steps 402-410 in FIG. 4).

Figure 5:
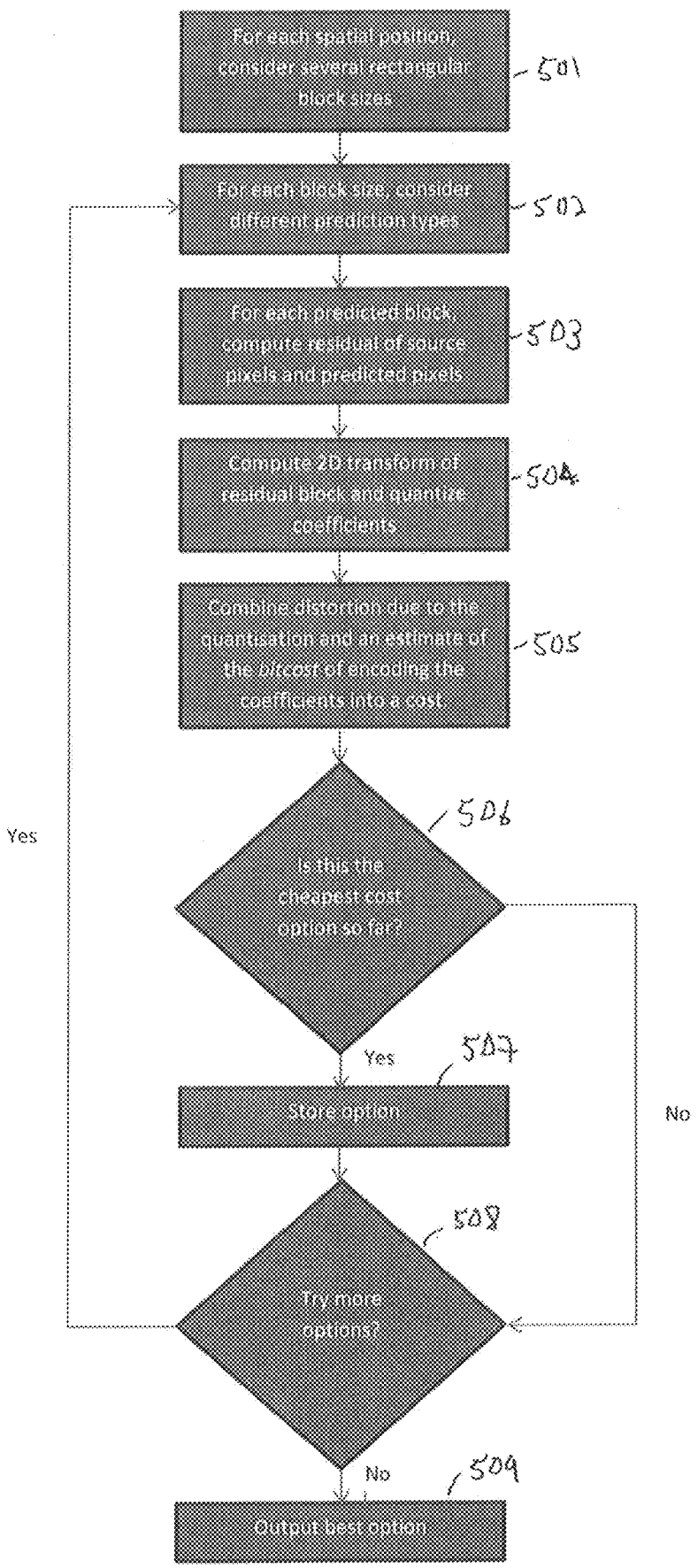
FIG. 5 shows a process for selecting a set of encoding options to use for encoding a region of a data array being encoded.

FIG. 5 shows this operation in more detail.

As shown in FIG. 5, the process starts by considering, for each spatial position in the array being encoded, several rectangular (source) block sizes (step 501). Then, for each block size, several different prediction types are considered (step 502). For each reference predicted block for a given block size, an array of difference values (the "residual") between the source block pixels (data elements) and the predicted (reference) block pixels (data elements) is determined (step 503).

A two-dimensional frequency domain transformation of the array of difference values (the residual block) is then determined, and a quantization process applied to the frequency domain coefficients to generate a set of quantized frequency domain coefficients (step 504). As shown in FIG. 1, this process in the present embodiments may comprise applying a full forward discrete cosine transformation process to the array of difference values (to the residual block) to generate an array of frequency domain coefficients, with a full quantization process then being applied to the array of frequency domain coefficients to generate an array of quantized frequency domain coefficients.

An estimate of the bit cost of encoding the array of quantized frequency domain coefficients is then combined with a distortion measure representing the distortion due to quantizing the coefficients, to provide an overall cost measure for that particular block size and prediction type being considered (step 505).

As discussed above, and shown in FIG. 1, the distortion measure may be determined by applying a full de-quantization process to the array of quantized frequency domain coefficients to generate an array of de-quantized frequency domain coefficients, with an inverse discrete cosine transformation process then being applied to the array of de-quantized frequency domain coefficients to generate an array of reconstructed difference values (a reconstructed residual block). The array of reconstructed difference values can then be added to the predicted (reference) block to generate a reconstructed source block, with the data elements of the reconstructed source block then being subtracted from the data elements of the original source block to generate a set of error values.

In the present embodiments, a sum-square distortion measuring process is then applied to the set of error values to determine the amount of distortion that would be introduced when encoding and then decoding a region of the array in accordance with the particular set of encoding options (i.e. block size and prediction type) under consideration.

The process for determining the bit cost for encoding the array of quantized frequency domain coefficients will be discussed further below.

The overall cost value may be determined from the distortion measure and the encoding bit cost in any suitable and desired manner. For example, the cost value may be determined as a weighted sum of the bit count value and the distortion value.

The determined overall cost value for the block size and prediction type being considered is then compared to the overall cost values for any previously considered block size and prediction types to determine if it is the cheapest (lowest) cost option so far (step 506). If so, the current block size and prediction type is stored as being the currently cheapest (lowest) determined cost option (step 507).

The process is then repeated for any further block size and prediction type options to be considered (step 508), with the cheapest cost option that is found once all the block size and prediction type options have been considered being output as the set of encoding options to use for that region of the frame being encoded (step 509).

Other arrangements would, of course, be possible.

As discussed above, in the present embodiments, the process of selecting an encoding option to use for a region of an array being encoded is based on, inter alia, a bit cost for encoding the array of quantized frequency domain coefficients for the source block being considered.

This bit cost represents the number of bits that will be needed to convey the necessary information about the array of quantized frequency domain coefficients to a decoder using the encoding scheme in question, and in the present embodiment estimates, and indicates (represents), a bit cost (number of bits) needed for encoding three elements of information: the values of all the non-zero quantised frequency domain coefficients in the array of quantized frequency domain coefficients; the locations of the non-zero coefficients within the array of frequency domain coefficients (the so-called "significant coefficient map"); and the location of the highest frequency non-zero coefficient in the array of frequency domain coefficients.

The bit cost for specifying the location of the highest frequency non-zero quantized frequency domain coefficient, and the bit cost for specifying the values of all of (of each of) the non-zero quantized frequency domain coefficients in the array of quantized frequency domain coefficients for the source block being encoded can be estimated and derived in any suitable and desired manner, for example using existing or known techniques for that purpose.

In the present embodiments the bit count value (the bit cost) for encoding the locations of the non-zero quantized frequency domain coefficients is estimated based on the number of non-zero quantized frequency domain coefficients in the array of quantized frequency domain coefficients determined for the block of data elements being considered, and the size of the array of quantized frequency domain coefficient positions for which the locations are to be indicated (in terms of the (total) number of different locations that there are in the array of frequency domain coefficients being considered), using a binary entropy function that takes as input parameters the number of non-zero frequency domain coefficients and the size of the array (the number of positions in the array) of frequency domain coefficients that is being considered, and that is operable to provide an estimate of the lower bound of the bit count value (the number of bits) that will be required for indicating the locations of the non-zero frequency domain coefficients in the array of quantized frequency domain coefficients based on these inputs, assuming a uniform distribution of the non-zero frequency domain coefficients within the array of quantized frequency domain coefficients.

More particularly, the estimation process assumes that there are (n choose k) k-sized subsets of an n-sized ground set, and so determines that the bit count value will be log 2 (n choose k) bits, i.e.

bit count value (number of bits)=$(-p*\log_2(p)-(1-p)*\log_2(1-p))*n$ where:

k is the number of non-zero frequency domain coefficients, and n is the number of frequency domain coefficient positions in the quantized frequency domain coefficient array being considered.

Figure 6:
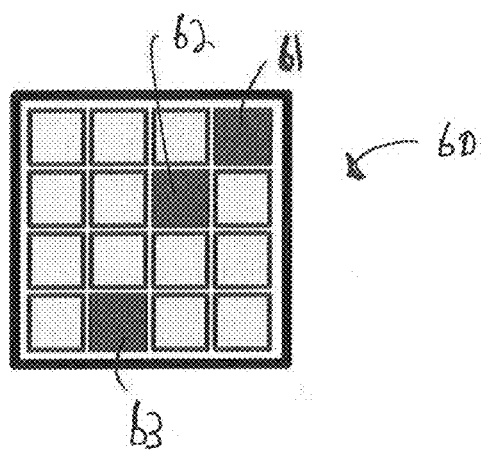
FIG. 6 illustrates the determining of a bit cost for encoding the locations of non-zero coefficients in an array of frequency domain coefficients in an embodiment of the technology described herein.

FIG. 6 illustrates this and shows an exemplary 4×4 array of quantized frequency domain coefficients 60, containing three non-zero coefficients 61, 62, 63. (In FIG. 6, the frequency domain coefficients having non-zero values are shown as darker squares.) There are accordingly:

(16 choose 3)=560 ways of selecting three distinct locations out of the sixteen possible locations in the 4×4 array 60 (assuming that the non-zero coefficients are uniformly distributed within the array 60) such that at least:

$\log_2(560)=9.13$ bits will be needed to encode the locations of the three non-zero coefficients in the 4×4 array of quantized frequency domain coefficients.

In the present embodiment, bit count values for encoding the location of the non-zero frequency domain coefficients are estimated for 4×4 quantized frequency domain coefficient arrays, with arrays of quantized frequency domain coefficients (and thus source blocks of data elements) that are larger than that particular array size then being processed as a plurality of 4×4 sub-arrays (sub-blocks) making up the overall array of frequency domain coefficients.

In this case therefore, a given array of frequency domain coefficients for a source block of data elements will be processed as (and divided into), if necessary, a plurality of 4×4 sub-arrays, each sub-array having a particular size, with bit count values being estimated in the above manner for each 4×4 sub-array individually, and the individual 4×4 sub-array bit count values then being combined (e.g. summed) to provide a bit count value estimate for the array of frequency domain coefficients for the source block of data elements as a whole.

Figure 7:
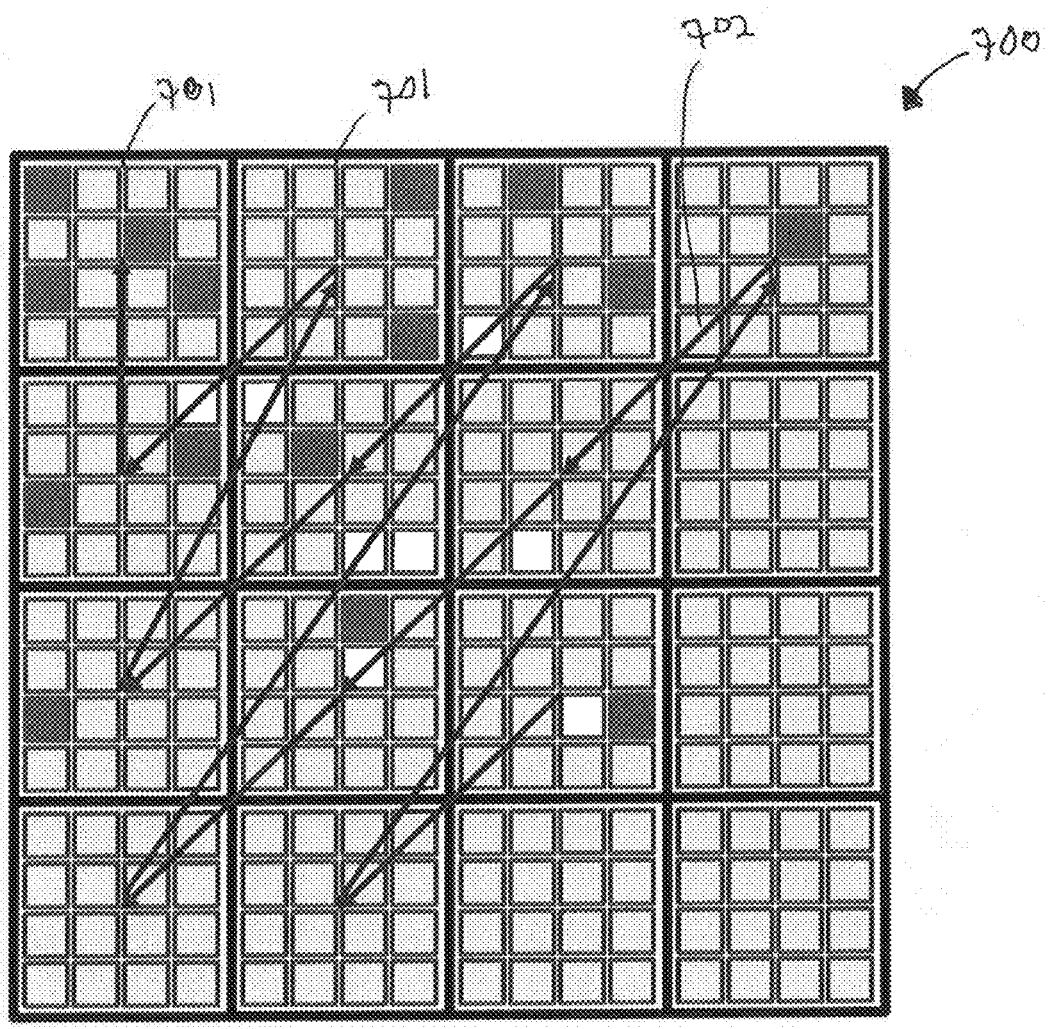
FIG. 7 further illustrates the determining of a bit cost for encoding the locations of non-zero coefficients in an array of frequency domain coefficients in an embodiment of the technology described herein.
Figure 8:
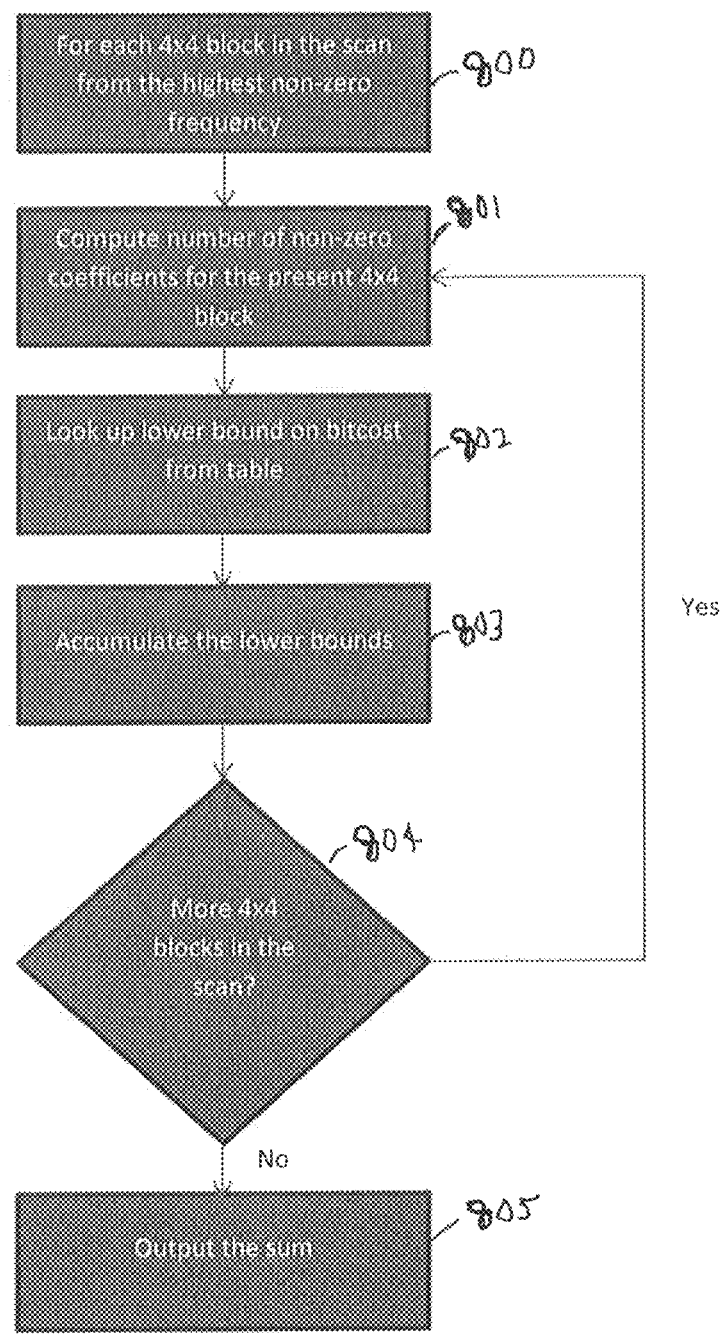
FIG. 8 further illustrates the determining of a bit cost for encoding the locations of non-zero coefficients in an array of frequency domain coefficients in an embodiment of the technology described herein.

FIGS. 7 and 8 illustrate this.

FIG. 7 shows schematically an exemplary 16×16 frequency domain coefficient array 700 that is correspondingly divided into a plurality of (in this case 16) 4×4 sub-arrays (sub-blocks) 701. As shown in FIG. 7, the sub-arrays 701 making up the overall array 700 of quantized frequency domain coefficients are arranged and considered in a particular scan order 702 corresponding to the frequency domain coefficients that they represent.

Again, in FIG. 7, the frequency domain coefficients having non-zero values are shown as darker squares.

FIG. 8 shows the process of determining and summing bit count costs for respective 4×4 sub-arrays (sub-blocks) of frequency domain coefficients making up an overall array of frequency domain coefficients (e.g. as shown in FIG. 7).

In this case, as shown in FIGS. 7 and 8, the individual 4×4 sub-arrays (blocks) making up the overall array of quantized frequency domain coefficients being considered are considered in turn in a particular scan order, starting with the 4×4 sub-array (block) in the scan having the highest non-zero frequency domain coefficient (step 700).

Then, for each block in turn in the scan, the number of non-zero frequency domain coefficients in the 4×4 sub-array (block) is determined (step 701), and that number of non-zero coefficients is then used to determine (and in this case look up) the corresponding lower bound bit count value (which has been determined as discussed above) for that 4×4 sub-array (block) (step 702). The determined bit cost value for the 4×4 sub-array (block) being considered is then accumulated with the values for any other 4×4 sub-arrays (blocks) that have already been considered (step 703).

This process is repeated until all the 4×4 sub-arrays (blocks) making up the overall array of quantized frequency domain coefficients have been considered (step 704), at which point the accumulated sum of the individual 4×4 sub-arrays (blocks) is output as a bit cost for encoding the locations of the non-zero frequency domain coefficients for the array of quantized frequency domain coefficients as a whole (step 705).

In the present embodiments, as well as summing bit count values for each 4×4 sub-array that contains non-zero quantized frequency domain coefficients to estimate the overall bit count value for encoding the locations of the non-zero quantized frequency domain coefficients for the source block of data elements being considered, a bit count value (bit cost) is also determined for indicating the locations of those 4×4 sub-arrays within the larger array that contain non-zero quantized frequency domain coefficients, which bit count value (bit cost) is then added to the individual 4×4 sub-array bit count values, so as to provide an overall bit count value (bit cost) for encoding the locations of the non-zero quantized frequency domain coefficients for the source block of data elements being considered.

For this estimate, the 4×4 sub-arrays making up the overall array are correspondingly considered as being a respective array of sub-arrays, with the locations of the sub-arrays having non-zero quantized frequency domain coefficients within that array of sub-arrays then needing to be indicated and encoded in the encoded bit stream.

The estimate of the bit count value for encoding the locations of the sub-arrays having non-zero quantized frequency domain coefficients within the "array" of sub-arrays is determined in a corresponding manner, i.e. by using a binary entropy function to estimate a lower bound for the number of bits needed to encode the locations of the sub-arrays having non-zero quantized frequency domain coefficients within the overall array based on the number of sub-arrays in the overall array that contain non-zero quantized frequency domain coefficients and the size of the "array" of sub-arrays (i.e. the number of sub-arrays in the overall array of frequency domain coefficients).

Thus, in the example shown in FIG. 8, there are nine 4×4 sub-arrays having non-zero coefficients, and sixteen 4×4 sub-arrays in total, such that there are accordingly:

(16 choose 9)=11440 ways of selecting nine distinct locations out of the sixteen possible locations in the overall array (assuming that the 4×4 sub-arrays with non-zero coefficients are uniformly distributed within the overall array) such that at least:

$\log_2(11440) = 13.48$ bits will be needed to encode the locations of the nine 4×4 sub-arrays having non-zero coefficients in the overall array of quantized frequency domain coefficients.

Other arrangements, such as estimating the bit count value for encoding the locations of the non-zero frequency domain coefficients for a given source block of data elements using a single estimation process for the block as a whole, irrespective of the size of the source block of data elements (and correspondingly irrespective of the size of the array of quantized frequency domain coefficients), could be used, if desired.

It would be possible to derive the estimate (to calculate the estimate) of a bit count value for a given array or sub-array of quantized frequency domain coefficients in use. Alternatively, e.g. particularly in the case where the bit count values are going to be determined for predefined array (sub-array) sizes, the bit count values for respective numbers of non-zero quantized frequency domain coefficients within a particular sized array could be determined in advance and stored, and then looked up in use based on the number of non-zero quantized frequency domain coefficients in the array (sub-array) in question.

Thus, as illustrated in FIG. 3, for example, the RDO circuitry 304 has access to a stored look-up table 320 that stores predefined bit count values for the different numbers of non-zero frequency domain coefficients that could be present in the arrays of frequency domain coefficients being considered (so, e.g., for 1 to 16 non-zero coefficients, where 4×4 (sub-arrays) are considered) (and predefined bit count values for the different numbers of 4×4 sub-arrays having non-zero frequency domain coefficients that could be present in the arrays of frequency domain coefficients being considered).

A process of encoding a source block of a source frame using a selected set of encoding options (e.g. as per step 412 of FIG. 4) will now be described with reference to FIG. 3.

Firstly, a selected reference block that is to be used to encode a selected source block is provided. For example, where the source block is to be encoded in inter mode, MC (motion compensation) circuitry 310 applies a selected motion vector generated by the ME circuitry 308 to a selected reference frame to derive the selected reference block. Similarly, where the source block is to be encoded in intra mode, a selected reference block of the source frame is derived by TRF (transform) circuitry 312.

In either case, the TRF circuitry 312 then subtracts the data elements of the selected source block from the data elements of the selected reference block to generate a set of difference values. The TRF circuitry 312 then applies a full forward discrete cosine transformation process to the set of difference values to generate a set of frequency domain coefficients. The TRF circuitry 312 then applies a full quantisation process to the set of frequency domain coefficients to generate a set of quantised coefficients.

A bitstream encoder/decoder 314 then encodes the coefficients for the source block that are generated by the TRF circuitry 312. The encoding scheme can comprise any suitable entropy (variable length) coding scheme.

As will be appreciated, the above encoding process is then repeated for each selected source block of the source frame using the selected sets of encoding options for the source frame.

The output of the bitstream encoder/decoder 314 is accordingly an encoded bitstream that comprises sets of encoded coefficients. The selected modes and/or motion vectors that were used in the encoding process are also included in the bitstream.

The encoded bitstream can then be output, e.g. to memory 216 or streamed to another device, via the interface 302.

A process of decoding an encoded source block (e.g. as per step 416 of FIG. 4) will also now be described with reference to FIG. 3.

First, an encoded bitstream is provided, e.g. from memory 216 or from another device, via the interface 302.

The bitstream encoder/decoder 314 then decodes the encoded bitstream to generate a set of quantised coefficients for the source block to be reconstructed. The decoding scheme can comprises any suitable decoding scheme that corresponds to the entropy encoding scheme that was used to encode the bitstream.

The TRF circuitry 312 then applies a full dequantisation process to the set of quantised coefficients to generate a set of frequency domain coefficients for the source block to be reconstructed. The TRF circuitry 312 then applies a full inverse discrete cosine transformation process to the set of frequency domain coefficients to generate a set of difference values for the source block to be reconstructed.

A reference block that was used to encode the source block is also provided. For example, where the source block was encoded in inter mode, the relevant reference block is derived from a previously reconstructed reference frame. Similarly, where the source block was encoded in intra mode, the relevant reference block is derived from a previously reconstructed region of the source frame.

In either case, the TRF circuitry 312 then adds the set of difference values to the data elements of the reference block to generate the data elements of the reconstructed source block.

As will be appreciated, the above decoding process is then repeated for each source block of the source frame.

A loop filter 316 is then used to smooth or "de-block" the regions of the reconstructed source frame. The reconstructed source frame can then be output, e.g. for display, via the interface 302.

Other arrangements for the data processing system 200, data processing apparatus 202 and video processor 208 would, of course, be possible.

It should again be noted here that the drawings are only schematic, and that, for example, in practice the shown elements may share significant hardware circuits, even though they are shown schematically as separate elements in the drawings. For example, one or more of the processes (e.g. motion compensation, transformation, quantisation, etc.) that are performed in the RDO process may be performed using the same circuitry as the equivalent steps that are performed in the encoding and/or decoding processes.

It can be seen from the above that the technology described herein, in embodiments at least, can provide a more efficient way of determining a bit cost value for encoding an array of quantized frequency domain coefficients, and thus a more efficient way of selecting encoding options to use when encoding an array of data elements, and without a detrimental reduction in the efficacy of the selection process.

This is achieved, in embodiments of the technology described herein at least, by estimating a bit count value for indicating the locations of the non-zero frequency domain coefficients in an array of frequency domain coefficients based on the number of non-zero coefficients in the array of frequency domain coefficients, and in an embodiment by estimating a lower bound for the number of bits that will be needed for encoding the locations of the non-zero coefficients in the array of frequency domain coefficients using the number of non-zero coefficients and the size of the array of frequency domain coefficients.

This then has the advantage of simplifying the bit cost function such that, for example, a bit cost value can simply be looked up based on the number of non-zero frequency domain coefficients. It also allows respective sub-arrays with an overall array of frequency domain coefficients being considered to be considered independently of each other and thus processed in any desired and arbitrary order (e.g., such that the processing of the respective sub-arrays can be distributed and may, e.g., be done in parallel). It also avoids the need to consider the arrays and sub-arrays in any particular order, and removes the need to track any state from one array or sub-array of frequency domain coefficients to another.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of selecting encoding options to use when encoding an array of data elements of a stream of arrays of data elements, the method comprising:
   in accordance with a particular set of encoding options:
   generating an array of difference values that represents the difference between a source block of data elements of the array of data elements being encoded and a reference block of data elements derived from one or more arrays of data elements of the stream of arrays of data elements;
   generating an array of frequency domain coefficients corresponding to the array of difference values by applying a forward transformation process to the array of difference values;
   generating an array of quantized frequency domain coefficients by applying a quantization process to the array of frequency domain coefficients;
   determining a bit count value for the particular set of encoding options for encoding the array of quantized frequency domain coefficients; and
   selecting, based on the bit count value, whether to encode the source block in accordance with the particular set of encoding options;
   wherein:
   the step of determining a bit count value for the particular set of encoding options for encoding the array of quantized frequency domain coefficients comprises:
   estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements; and
   the estimating a bit count value comprising at least one of:
   (i) estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements using a binary entropy function;

(ii) estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements by estimating a lower bound of the number of bits that will be required for indicating the locations of the non-zero frequency domain coefficients in the array of quantized frequency domain coefficients;

(iii) estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements and on there being a uniform distribution of the non-zero frequency domain coefficients within the array of quantized frequency domain coefficients;

(iv) estimating a bit count value for encoding the locations of the non-zero quantized frequency domain coefficients for a source block of data elements by:
  determining the number of non-zero quantized frequency domain coefficients in the array of quantized frequency domain coefficients; and
  retrieving a predetermined bit count value corresponding to the determined number of non-zero quantized frequency domain coefficients to use as the estimate of the bit count value for encoding the locations of the non-zero quantized frequency domain coefficients;
and (v) estimating a bit count value for encoding the locations of the non-zero quantized frequency domain coefficients for the source block of data elements by:
  for each of a plurality of sub-arrays making up the array of frequency domain coefficients for the source block of data elements, estimating a bit count value for the sub-array for encoding the locations of the non-zero quantized frequency domain coefficients within the sub-array; and
  combining the sub-array estimates to provide an estimate of the bit count value for encoding the locations of the non-zero quantized frequency domain coefficients in the array of quantized frequency domain coefficients for the source block of data elements.

2. The method of claim 1, further comprising:
estimating the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements and the size of the array of quantized frequency domain coefficients.

3. The method of claim 1, wherein the estimating a bit count value comprises:
estimating the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements using a binary entropy function.

4. The method of claim 1, wherein the estimating a bit count value comprises:
estimating the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements by estimating a lower bound of the number of bits that will be required for indicating the locations of the non-zero frequency domain coefficients in the array of quantized frequency domain coefficients.

5. The method of claim 1, wherein the estimating a bit count value comprises:
estimating the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements and on there being a uniform distribution of the non-zero frequency domain coefficients within the array of quantized frequency domain coefficients.

6. The method of claim 1, wherein the estimating a bit count value comprises:
estimating the bit count value for encoding the locations of the non-zero quantized frequency domain coefficients for a source block of data elements by:
  determining the number of non-zero quantized frequency domain coefficients in the array of quantized frequency domain coefficients; and
  retrieving a predetermined bit count value corresponding to the determined number of non-zero quantized frequency domain coefficients to use as the estimate of the bit count value for encoding the locations of the non-zero quantized frequency domain coefficients.

7. The method of claim 1, wherein the estimating a bit count value comprises:
estimating the bit count value for encoding the locations of the non-zero quantized frequency domain coefficients for the source block of data elements by:
  for each of a plurality of sub-arrays making up the array of frequency domain coefficients for the source block of data elements, estimating a bit count value for the sub-array for encoding the locations of the non-zero quantized frequency domain coefficients within the sub-array; and
  combining the sub-array estimates to provide the estimate of the bit count value for encoding the locations of the non-zero quantized frequency domain coefficients in the array of quantized frequency domain coefficients for the source block of data elements.

8. The method of claim 1, further comprising:
estimating the bit count value for encoding the locations of the non-zero quantized frequency domain coefficients for the source block of data elements by:

for each of a plurality of sub-arrays making up the array of frequency domain coefficients for the source block of data elements, estimating a bit count value for the sub-array for encoding the locations of the non-zero quantized frequency domain coefficients within the sub-array;

estimating a bit count value for encoding the locations within the array of frequency domain coefficients for the source block of data elements of the sub-arrays containing non-zero quantized frequency domain coefficients; and combining the sub-array estimates and the bit count value estimate for encoding the locations of the sub-arrays containing non-zero quantized frequency domain coefficients within the array of frequency domain coefficients for the source block of data elements, to provide an estimate of the bit count value for encoding the locations of the non-zero quantized frequency domain coefficients in the array of quantized frequency domain coefficients for the source block of data elements.

9. The method of claim 1, wherein:

the step of determining a bit count value for the particular set of encoding options for encoding the array of quantized frequency domain coefficients comprises:

combining the estimated bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements with at least one of:

an estimated bit count value for specifying the location of the highest frequency non-zero quantized frequency domain coefficient in the array of quantized frequency domain coefficients; and an estimated bit count value for specifying the values of the non-zero quantized frequency domain coefficients in the array of quantized frequency domain coefficients for the source block being encoded.

10. The method of claim 1, comprising:

selecting whether to encode the source block in accordance with the particular set of encoding options based on the estimated bit count value and a distortion value indicative of an amount of distortion that would be introduced when encoding and then decoding the source block in accordance with the particular set of encoding options.

11. An apparatus for selecting encoding options to use when encoding an array of data elements of a stream of arrays of data elements, the apparatus comprising:

a difference value generating circuit operable to generate an array of difference values that represents the difference between a source block of data elements of the array of data elements being encoded and a reference block of data elements derived from one or more arrays of data elements of the stream of arrays of data elements;

a frequency domain coefficient generating circuit operable to generate an array of frequency domain coefficients corresponding to the array of difference values by applying a forward transformation process to the array of difference values;

a quantizing circuit operable to generate an array of quantized frequency domain coefficients by applying a quantization process to the array of frequency domain coefficients;

a bit count value determining circuit operable to determining a bit count value for encoding the array of quantized frequency domain coefficients; and a selection circuit operable to select, based on the bit count value, a set of encoding options to use to encode the source block;

wherein:

the bit count value determining circuit is operable to determine a bit count value for encoding the array of quantized frequency domain coefficients by:

estimating a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements;

and wherein:

the bit count value determining circuit is operable to estimate a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements by at least one of:

(i) estimating the bit count value for encoding the locations of the non-zero quantized frequency domain coefficients in the array of quantized frequency domain coefficients for the source block of data elements using a binary entropy function;

(ii) estimating a lower bound of the number of bits that will be required for indicating the locations of the non-zero frequency domain coefficients in the array of quantized frequency domain coefficients;

(iii) estimating the bit count value for encoding the locations of the non-zero quantized frequency domain coefficients in the array of quantized frequency domain coefficients for the source block of data elements based on there being a uniform distribution of the non-zero frequency domain coefficients within the array of quantized frequency domain coefficients;

(iv) determining the number of non-zero quantized frequency domain coefficients in the array of quantized frequency domain coefficients and retrieving a predetermined bit count value corresponding to the determined number of non-zero quantized frequency domain coefficients to use as the estimate of the bit count value for encoding the locations of the non-zero quantized frequency domain coefficients;

and (v) for each of a plurality of sub-arrays making up the array of frequency domain coefficients for the source block of data elements, estimating a bit count value for the sub-array for encoding the locations of the non-zero quantized frequency domain coefficients within the sub-array, and combining the sub-array estimates to provide an estimate of the bit count value for encoding the locations of the non-zero quantized frequency domain coefficients in the array of quantized frequency domain coefficients for the source block of data elements.

12. The apparatus of claim 11, wherein:

the bit count value determining circuit is further operable to:

estimate a bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements and the size of the array of quantized frequency domain coefficients.

13. The apparatus of claim 11, wherein:
the bit count value determining circuit is operable to:
estimate the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements using a binary entropy function.

14. The apparatus of claim 11, wherein:
the bit count value determining circuit is operable to:
estimate the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements by estimating a lower bound of the number of bits that will be required for indicating the locations of the non-zero frequency domain coefficients in the array of quantized frequency domain coefficients.

15. The apparatus of claim 11, wherein:
the bit count value determining circuit is operable to:
estimate the bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements and on there being a uniform distribution of the non-zero frequency domain coefficients within the array of quantized frequency domain coefficients.

16. The apparatus of claim 11, wherein:
the bit count value determining circuit is operable to:
estimate the bit count value for encoding the locations of the non-zero quantized frequency domain coefficients for a source block of data elements by:
determining the number of non-zero quantized frequency domain coefficients in the array of quantized frequency domain coefficients; and
retrieving a predetermined bit count value corresponding to the determined number of non-zero quantized frequency domain coefficients to use as the estimate of the bit count value for encoding the locations of the non-zero quantized frequency domain coefficients.

17. The apparatus of claim 11, wherein:
the bit count value determining circuit is operable to:
estimate the bit count value for encoding the locations of the non-zero quantized frequency domain coefficients for the source block of data elements by:
for each of a plurality of sub-arrays making up the array of frequency domain coefficients for the source block of data elements, estimating a bit count value for the sub-array for encoding the locations of the non-zero quantized frequency domain coefficients within the sub-array; and
combining the sub-array estimates to provide an estimate of the bit count value for encoding the locations of the non-zero quantized frequency domain coefficients in the array of quantized frequency domain coefficients for the source block of data elements.

18. The apparatus of claim 11, wherein:
the bit count value determining circuit is further operable to:
estimate the bit count value for encoding the locations of the non-zero quantized frequency domain coefficients for the source block of data elements by:
for each of a plurality of sub-arrays making up the array of frequency domain coefficients for the source block of data elements, estimating a bit count value for the sub-array for encoding the locations of the non-zero quantized frequency domain coefficients within the sub-array;
estimating a bit count value for encoding the locations within the array of frequency domain coefficients for the source block of data elements of the sub-arrays containing non-zero quantized frequency domain coefficients; and
combining the sub-array estimates and the bit count value estimate for encoding the locations of the sub-arrays containing non-zero quantized frequency domain coefficients within the array of frequency domain coefficients for the source block of data elements, to provide an estimate of the bit count value for encoding the locations of the non-zero quantized frequency domain coefficients in the array of quantized frequency domain coefficients for the source block of data elements.

19. The apparatus of claim 11, wherein:
the bit count value determining circuit is further operable to determine a bit count value for encoding the array of quantized frequency domain coefficients by:
combining an estimated bit count value for encoding the locations of the non-zero quantized frequency domain coefficients in the array of quantized frequency domain coefficients for the source block of data elements based on the number of non-zero frequency domain coefficients in the array of quantized frequency domain coefficients for the source block of data elements with at least one of:
an estimated bit count value for specifying the location of the highest frequency non-zero quantized frequency domain coefficient in the array of quantized frequency domain coefficients; and
an estimated bit count value for specifying the values of the non-zero quantized frequency domain coefficients in the array of quantized frequency domain coefficients for the source block being encoded.

20. The apparatus of claim 11, wherein the selection circuit is operable to:
select whether to encode the source block in accordance with the particular set of encoding options based on the estimated bit count value and a distortion value indicative of an amount of distortion that would be introduced when encoding and then decoding the source block in accordance with the particular set of encoding options.

21. An apparatus for determining a bit count value for encoding an array of quantized frequency domain coefficients for an encoding process that uses an array of quantized frequency domain coefficients for encoding an array of difference values that represent the difference between a source block of data elements and a reference block of data elements, the apparatus comprising:
a bit count value estimating circuit configured to estimate a bit count value for encoding the locations of the non-zero quantized frequency domain coefficients in an array of quantized frequency domain coefficients based on the number of non-zero frequency domain coefficients in the array of quantized frequency domain coefficients;

wherein the bit count value estimating circuit is configured to estimate a bit count value for encoding the locations of the non-zero quantized frequency domain coefficients in an array of quantized frequency domain coefficients based on the number of non-zero frequency domain coefficients in the array of quantized frequency domain coefficients by at least one of:
(i) estimating the bit count value for encoding the locations of the non-zero quantized frequency domain coefficients in the array of quantized frequency domain coefficients using a binary entropy function;
(ii) estimating a lower bound of the number of bits that will be required for indicating the locations of the non-zero frequency domain coefficients in the array of quantized frequency domain coefficients;
(iii) estimating the bit count value for encoding the locations of the non-zero quantized frequency domain coefficients in the array of quantized frequency domain coefficients based on there being a uniform distribution of the non-zero frequency domain coefficients within the array of quantized frequency domain coefficients;
(iv) determining the number of non-zero quantized frequency domain coefficients in the array of quantized frequency domain coefficients and retrieving a predetermined bit count value corresponding to the determined number of non-zero quantized frequency domain coefficients to use as the estimate of the bit count value for encoding the locations of the non-zero quantized frequency domain coefficients; and
(v) for each of a plurality of sub-arrays making up the array of frequency domain coefficients, estimating a bit count value for the sub-array for encoding the locations of the non-zero quantized frequency domain coefficients within the sub-array, and combining the sub-array estimates to provide an estimate of the bit count value for encoding the locations of the non-zero quantized frequency domain coefficients in the array of quantized frequency domain coefficients.

22. A non-transitory computer readable storage medium storing computer software code which when executed on a processor performs a method of determining a bit count value for encoding an array of quantized frequency domain coefficients for an encoding process that uses an array of quantized frequency domain coefficients for encoding an array of difference values that represent the difference between a source block of data elements and a reference block of data elements, the method comprising:
estimating a bit count value for encoding the locations of the non-zero quantized frequency domain coefficients in an array of quantized frequency domain coefficients based on the number of non-zero frequency domain coefficients in the array of quantized frequency domain coefficients wherein:
the step of estimating a bit count value for encoding the locations of the non-zero quantized frequency domain coefficients in the array of quantized frequency domain coefficients based on the number of non-zero frequency domain coefficients in the array of quantized frequency domain coefficients comprises at least one of:
(i) estimating a bit count value for encoding the locations of the non-zero quantized frequency domain coefficients in the array of quantized frequency domain coefficients based on the number of non-zero frequency domain coefficients in the array of quantized frequency domain coefficients using a binary entropy function;
(ii) estimating a bit count value for encoding the locations of the non-zero quantized frequency domain coefficients in the array of quantized frequency domain coefficients based on the number of non-zero frequency domain coefficients in the array of quantized frequency domain coefficients by estimating a lower bound of the number of bits that will be required for indicating the locations of the non-zero frequency domain coefficients in the array of quantized frequency domain coefficients;
(iii) estimating a bit count value for encoding the locations of the non-zero quantized frequency domain coefficients in the array of quantized frequency domain coefficients based on the number of non-zero frequency domain coefficients in the array of quantized frequency domain coefficients and on there being a uniform distribution of the non-zero frequency domain coefficients within the array of quantized frequency domain coefficients;
(iv) estimating a bit count value for encoding the locations of the non-zero quantized frequency domain coefficients by:
determining the number of non-zero quantized frequency domain coefficients in the array of quantized frequency domain coefficients; and
retrieving a predetermined bit count value corresponding to the determined number of non-zero quantized frequency domain coefficients to use as the estimate of the bit count value for encoding the locations of the non-zero quantized frequency domain coefficients; and
(v) estimating a bit count value for encoding the locations of the non-zero quantized frequency domain coefficients by:
for each of a plurality of sub-arrays making up the array of frequency domain coefficients, estimating a bit count value for the sub array for encoding the locations of the non-zero quantized frequency domain coefficients within the sub-array; and
combining the sub-array estimates to provide an estimate of the bit count value for encoding the locations of the non-zero quantized frequency domain coefficients in the array of quantized frequency domain coefficients.

* * * * *